US008442354B2

(12) United States Patent
Nakashio

(10) Patent No.: US 8,442,354 B2
(45) Date of Patent: May 14, 2013

(54) IMAGE PROCESSING APPARATUS AND IMAGE PROCESSING METHOD CAPABLE OF TRANSMISSION/RECEPTION AND RECORDING OF IMAGE FILE OBTAINED BY PANORAMIC IMAGE SHOT

(75) Inventor: Hidekazu Nakashio, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 12/758,327

(22) Filed: Apr. 12, 2010

(65) Prior Publication Data
US 2010/0265314 A1  Oct. 21, 2010

(30) Foreign Application Priority Data

Apr. 16, 2009  (JP) ................................. 2009-100174

(51) Int. Cl.
H06K 9/36 (2006.01)
H04N 7/00 (2011.01)
(52) U.S. Cl.
USPC ............................................. 382/284; 348/36
(58) Field of Classification Search .................. 382/284, 382/276, 294; 348/36, 584–601; 345/629–641
See application file for complete search history.

(56) References Cited

U.S. PATENT DOCUMENTS

| 6,424,752 | B1* | 7/2002 | Katayama et al. | 382/284 |
| 6,549,681 | B1* | 4/2003 | Takahashi et al. | 382/294 |
| 6,885,776 | B2* | 4/2005 | Takakura et al. | 382/284 |
| 7,009,638 | B2* | 3/2006 | Gruber et al. | 348/218.1 |
| 7,606,441 | B2* | 10/2009 | Ouchi | 382/294 |
| 7,672,538 | B2* | 3/2010 | Aiso | 382/284 |
| 8,107,769 | B2* | 1/2012 | Shimizu | 382/284 |
| 2005/0237566 | A1 | 10/2005 | Sakuda et al. | |
| 2007/0003164 | A1* | 1/2007 | Takata et al. | 382/284 |

FOREIGN PATENT DOCUMENTS

| JP | 2005-191894 A | 7/2005 |
| JP | 2005-223518 A | 8/2005 |
| JP | 2006-293851 A | 10/2006 |
| JP | 2008-288798 A | 11/2008 |

* cited by examiner

Primary Examiner — Yon Couso
(74) Attorney, Agent, or Firm — Fitzpatrick, Cella, Harper & Scinto

(57) ABSTRACT

In recording an image file that is shot by panoramic image shooting, a plurality of pieces of image data are recorded in the image file, and therefore there is a problem that the file size increases. Although it is possible to reduce the file size by applying higher compression processing using JPEG or the like, there is a problem that the image degradation appears noticeably. With respect to an input image file, it is determined whether or not it is the one obtained by panoramic image shooting, and then at the time of recording, one of two overlap areas is deleted and the positional information on the other overlap area is attached. Thereafter, at the time of transmission or printing, the overlap area is restored based on the attached positional information. In this manner, the file size at the time of recording is reduced without degrading the image.

6 Claims, 19 Drawing Sheets

IMAGE PROCESSING APPARATUS AND IMAGE PROCESSING METHOD CAPABLE OF TRANSMISSION/RECEPTION AND RECORDING OF IMAGE FILE OBTAINED BY PANORAMIC IMAGE SHOT

BACKGROUND OF THE INVENTION

1. Field of the Invention

The present invention relates to image processing apparatuses and image processing methods, and in particular relates to an image processing apparatus and image processing method capable of transmission/reception and recording of an image file obtained by panoramic image capturing.

2. Description of the Related Art

In recent years, there has been an increasing number of electronic devices that record a still image and a moving image on a recording medium, as with a digital camera. The conventional digital cameras often have multiple recording operation modes, such as a continuous shooting function to continuously record still images, an auto bracket shooting function to shoot a plurality of times while changing the imaging conditions, and a panoramic image shooting function to shoot a wide range with a plurality of shots. Each image file recorded in these multiple recording operation modes is managed by a directory entry of a recording medium, and is subjected to a reproduction operation, an erasing operation, and the like in units of a file. In the case of moving images, one file has a plurality of frame images and an edit function may be realized by an erase operation and the like in the units of a frame.

Since a plurality of image files are required in creating a panoramic image by superimposing a plurality of input images, the file size will increase. This poses problems, such as an increase of the size of a storage capacity in the image processing apparatus, and a decrease of the speed of network transfer or FAX transmission. With respect to such problems, there has been a proposal in the image recording devices, such as an electronic camera device, that in synthesizing a panoramic image by superimposing a plurality of input images, the memory capacity of a canvas serving as an image memory is reduced by devising the weighting of synthesis (see Japanese Patent Laid-Open No. 2006-293851).

However, the technique according to Japanese Patent Laid-Open No. 2006-293851 is simply a technique to reduce the image memories (campus memories) required in synthesizing a panoramic image. When a panoramic image is synthesized by superimposing a plurality of images, a technique to record a plurality of images on a recording medium or a technique to transfer these images will be required. However, Japanese Patent Laid-Open No. 2006-293851 does not refer to a technique to efficiently store or transfer a plurality of images for forming these panoramic images, at all. Moreover, although it is possible to reduce the file size by performing a higher compression processing by JPEG or the like, there is a problem that image degradation appears noticeably.

SUMMARY OF THE INVENTION

According to the present invention, in an image processing apparatus that generates a panoramic image by synthesizing a plurality of images, the file size is reduced without degrading the image.

An image processing apparatus according to the present invention comprises: receiving unit for receiving a plurality of pieces of image data; a panoramic image determining unit for determining whether or not a type of the received image data is image data of a panoramic image group; an overlap area extracting unit for extracting an overlap area that is an overlapping area in the plurality of pieces of image data, when a determination result of the panoramic image determining unit indicates the image data of the panoramic image group; a deleting unit for deleting the overlap area extracted by the overlap area extracting unit, with respect to one of the plurality of pieces of image data; a positional information attaching unit for attaching positional information indicative of other overlap area having the overlapping area, to the image data whose overlap area has been deleted by the deleting unit; and a recording unit for storing therein an image file, the image file including image data to which the positional information are attached and image data having said other overlap area.

According to the present invention, with regard to the spool in storing or transferring a panoramic image, it is possible to reduce the file size without degrading the image.

Further features of the present invention will become apparent from the following description of exemplary embodiments (with reference to the attached drawings).

DESCRIPTION OF THE EMBODIMENTS

Hereinafter, the best mode for implementing the present invention will be described with reference to the accompanying drawings.

Note that, as the best mode for implementing the present invention, the description will be made in the following using the case of a multiple function device, however, the present invention is not limited thereto without departing from the scope and spirit of the present invention.

In the following description, the description will be made in relation to a technique called a multi-picture format (MPF).

MPF is a technique for managing recorded image data that is recorded on a recording medium in a plurality of operation modes, such as the above-described panoramic imaging mode. Specifically, MPF is a technique (the standard) related to an image data structure, wherein one file comprises a plurality of pieces of image data. MPF is an Exif standard-based technique, wherein head image data and associated still picture data (referred to as "individual image") are recorded on the same file. According to this MPF, functional enhancement is possible while maintaining backward compatibility with the Exif standard. It is possible to upgrade the MPF by adding a recording-data type corresponding to the future technical progress or new need. Note that, the Exif standard is one of the standards for image files, wherein in addition to the image data, attached information, such as information on an image and the shooting date and time, is recorded.

In the Exif standard, one image file contains one image data. On the other hand, the MPF is characterized in that one image file contains a plurality of pieces of image data. In such an MPF, since the file size becomes larger than that of the conventional image file, there is an increased requirement for preventing a decrease in the network transfer rate by reducing the storage capacity of the file size.

In the following, embodiments using such an MPF will be described.

Embodiment 1

Figure 1:
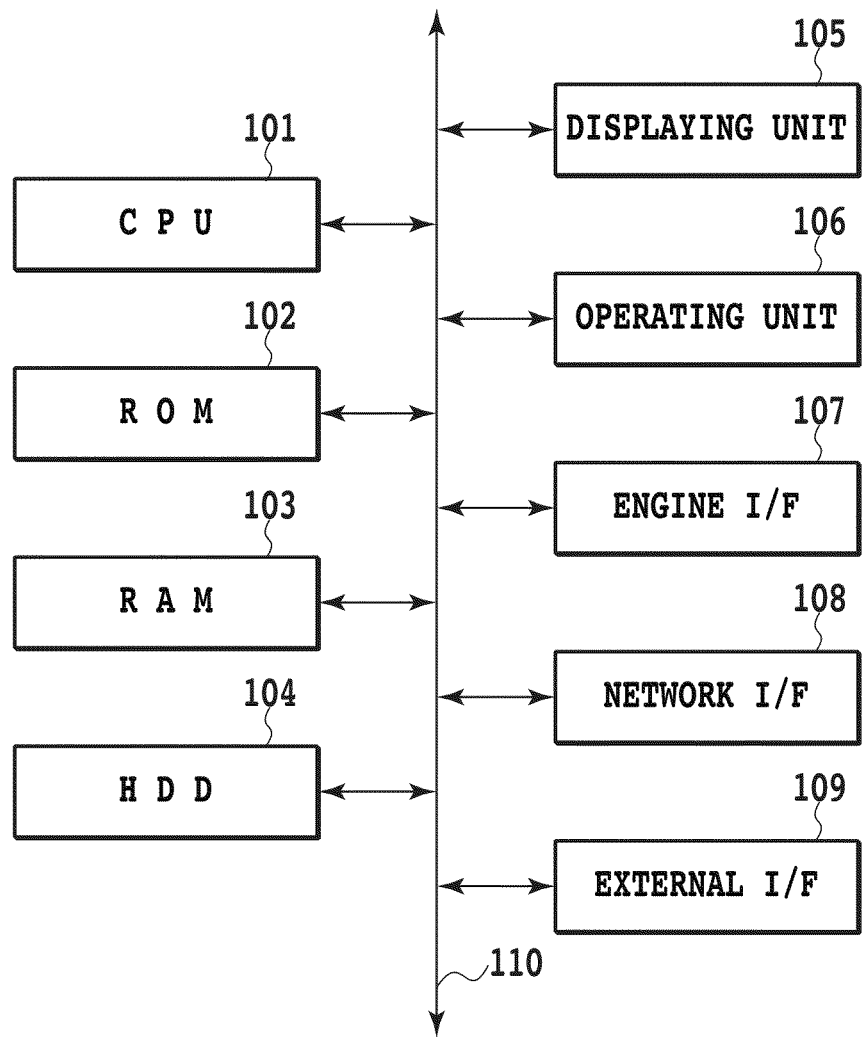
FIG. 1 is a system block diagram illustrating a configuration of an image processing apparatus.

FIG. 1 is a system block diagram illustrating a basic configuration of an image processing apparatus, showing an embodiment of the present invention. As an example apparatus, the image processing apparatus corresponds to a color or monochrome image processing apparatus, for example such as a digital electrophotography copying machine, a laser printer, or a facsimile. The image processing apparatus according to the embodiment of the present invention comprises a CPU 101, a ROM 102, a RAM 103, an HDD 104, a displaying unit 105, an operating unit 106, an engine I/F 107, a network I/F 108, an external I/F 109, and a system bus 110.

For more in detail of the above-described configuration, the CPU 101 is a central processing unit for controlling the whole apparatus and executing arithmetic processing and the like, and performs each processing to be described later, based on a program stored in the ROM 102. The ROM 102 is a read only memory and has a storage area for a system startup program, a program for controlling a printer engine, character data or character code information, and the like. The RAM 103 is random access memory and has a data storage area with no usage restriction where font data that is additionally registered by downloading is stored or a program or data is loaded and executed for each of various processings. The RAM 103 also can be used as the data storage area of a received image file. The HDD 104 comprises a hard disk or the like, for example, and spools data, stores a program, each information file/image data, and the like, or is used as a work area. The displaying unit 105 is for displaying with a liquid crystal or the like. The displaying unit 105 is used in displaying a setting status of the apparatus, the current processing within the apparatus, an error status, and the like. The operating unit 106 is used to modify or reset a setting. With the use of the operating unit 106, the setting of a toner reduction rate in printing also can be operated from a UI screen or the like displayed on the displaying unit 105. The engine I/F 107 is a portion through which a command and the like to actually control the printer engine are transmitted/received. The network I/F 108 is for coupling the device to a network via the network I/F 108. The external I/F 109 is coupled to an external device via a parallel (or serial) interface. The system bus 110 should serve as a data path between the above-described structural elements.

Figure 2:
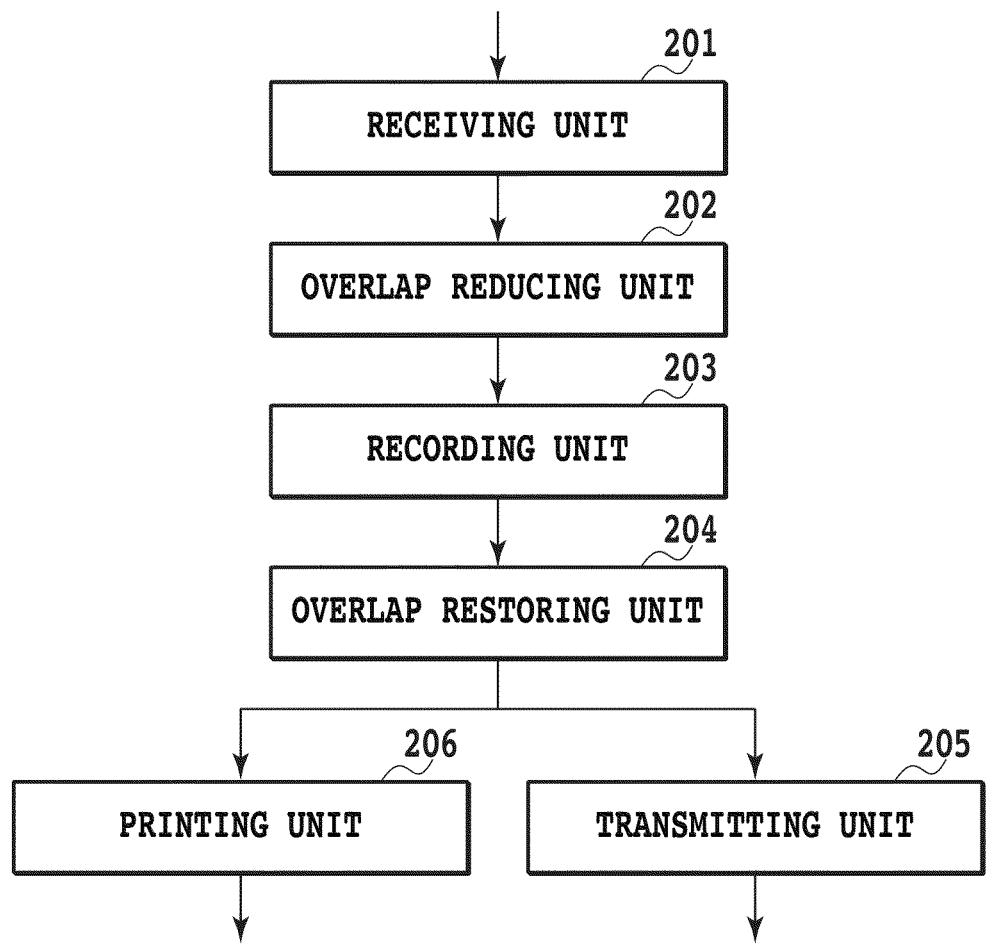
FIG. 2 is a block diagram illustrating an overall configuration of a controller software of the image processing apparatus.

FIG. 2 is a block diagram illustrating a schematic configuration of a controller software of the image processing apparatus, showing an embodiment of the present invention.

A receiving unit 201 receives an image file. From the receiving unit 201, an image file comprising image data shot by an imaging device (not illustrated) and shooting information at the time of shooting the image data are input. Note that, in this embodiment, the imaging device that records an image file to be input includes at least a panoramic image shooting function along with an ordinary imaging function. The panoramic image shooting function is to shoot an extremely wide horizontal width (field angle) in a continuous manner or a plurality of times while changing the lens direction, and thereafter create a panoramic image by joining together a plurality of pieces of image data on a PC. Note that the panoramic image shooting function also includes a function to continuously shoot while changing not only the horizontal width but the vertical width in the lens direction. Or, the panoramic image shooting function also includes a function to continuously shoot while changing both the vertical width and the horizontal width in the lens direction. In joining together a plurality of pieces of image data, an overlap area is required between two pieces of image data. The overlap area means an area where images indicated by two pieces of image data overlap with each other. The more overlap areas a panoramic image has, the more polygonal and the nearer to a circle the panoramic image can become. The method of receiving an image file may be a method of receiving the image file through the network I/F 108 using a driver or the like on a PC or a method of directly obtaining the image file through the external I/F 109 using a digital camera or the like. In other words, the image file may be obtained using any method. The thus input image data is stored in the RAM 103. Note that the input image file here is assumed to include one or more pieces of image data.

The overlap deleting unit 202 deletes the file size at the time of recording by deleting an overlap area of one of two pieces of image data contained in an image file that is received by the receiving unit 201 and attaching positional information on an overlap area of the other image data to the image data whose overlap area has been deleted. The detailed description will be made later.

The recording unit 203 records onto the HDD the image file that has been subjected to the image processing by the overlap deleting unit 202. Through the above-described processings, the image file received from the imaging device such as a digital camera is written and stored onto the HDD 104 in the state where its capacity reduced.

The overlap restoring unit 204 restores the deleted overlap area based on the attached positional information, with respect to the image file that has been subjected to the overlap deletion by the overlap deleting unit 202. The detailed description will be made later.

The transmitting unit 205 transmitting an image file may synthesize each image data recorded on the image file to generate and transmit a panoramic image or may send each image data group without synthesizing the panoramic image. The method of transmitting an image file may be a method of transmitting the image file to a PC or other image processing apparatus through the network I/F 108 or may be a method of transmitting the image file to an external recording device or the like through the external I/F 109. In other words, an image file may be transmitted using any method.

The printing unit 206 for printing an image file subjects the image file to a predetermined image processing and outputs the resultant file. At this time, the printing unit 206 may combine each image data recorded on the image file to generate and output a panoramic image, or may output each image data alone.

In the example of FIG. 2 described above, an example is shown, in which a processing to delete an overlap area and a processing to restore the overlap area are performed in the same image processing apparatus. However, the processing to delete an overlap area and the processing to restore the overlap area may be performed in separate image processing apparatuses, respectively.

Figure 3:
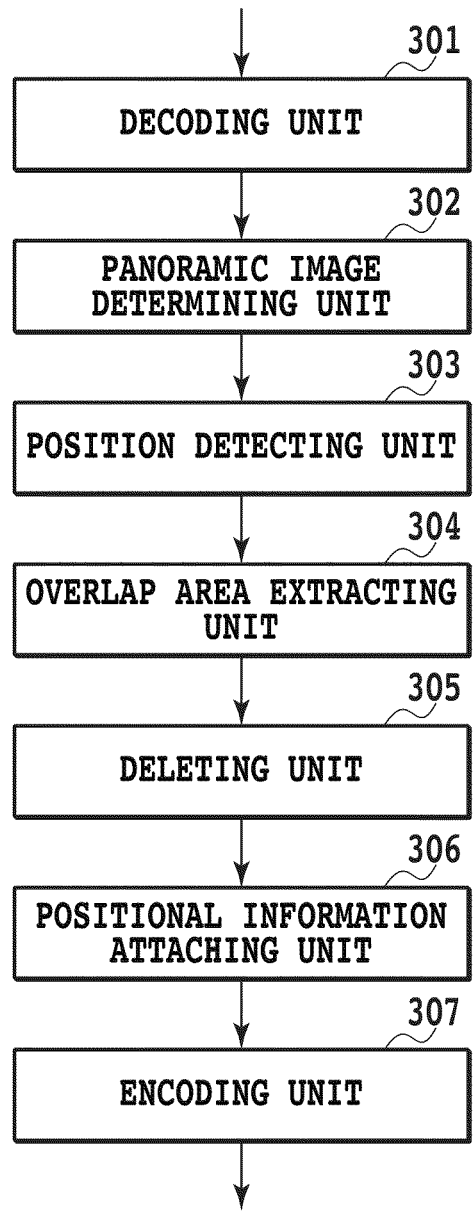
FIG. 3 is a block diagram illustrating an internal configuration of an overlap deleting unit 202 in Embodiment 1.

FIG. 3 is a block diagram illustrating a detailed configuration of the overlap deleting unit 202, showing an embodiment of the present invention.

A decoding unit 301 is a portion to decode an encoded image file that is received and input.

A panoramic image determining unit (first panoramic image determining unit) 302 determines whether or not an image data group stored in an image file is image data of a panoramic image group, with respect to the decoded image file. The specific determination method will be described later.

A position detecting unit 303 detects a joining position required in joining together a plurality of pieces of image data recorded in the image file when the image data group is determined to be the image data of a panoramic image group by the panoramic image determining unit 302.

An overlap area extracting unit 304 extracts an overlap area where two pieces of image data are overlapped with each other, based on the joining position detected by the position detecting unit 303.

A deleting unit 305 deletes an overlap area of one of two pieces of image data extracted by the overlap area extracting unit 304.

A positional information attaching unit 306 attaches, to the image data whose overlap area has been deleted by the deleting unit 305, positional information on an overlap area of the other image data.

An encoding unit 307 carries out encoding on the image file having been subjected to a series of processings.

Figure 4:
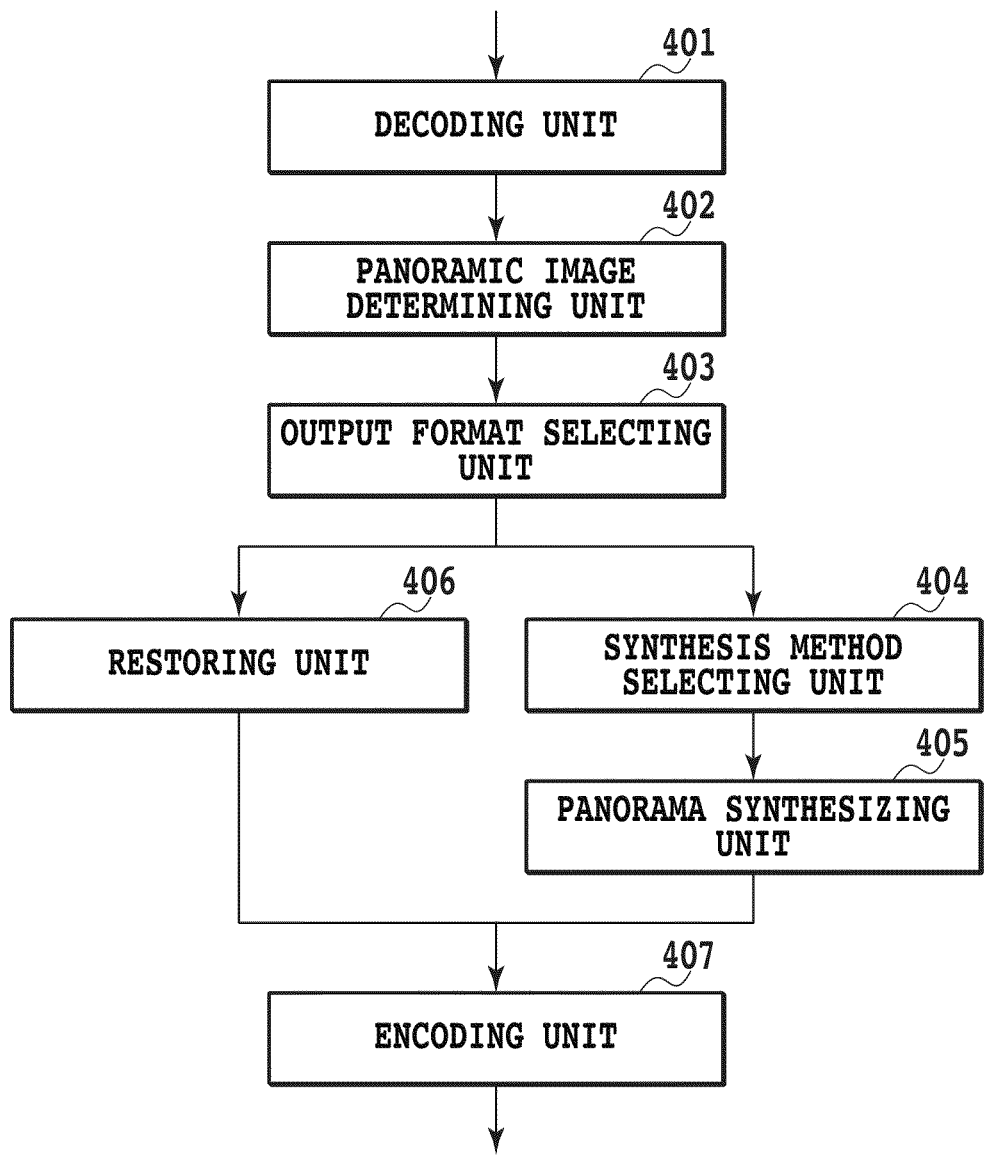
FIG. 4 is a block diagram illustrating an internal configuration of an overlap restoring unit 204 in Embodiment 1.

FIG. 4 is a block diagram illustrating a detailed configuration of the overlap restoring unit 204, showing an embodiment of the present invention.

A decoding unit 401 is a portion to decode an encoded image file. This encoded image file is an image file recorded on the recording unit 203, the image file having been encoded through the encoding processing by the encoding unit 307, the encoding processing being performed on the image file which includes image data whose overlap part has been deleted by the overlap deleting unit 202.

A panoramic image determining unit (second panoramic image determining unit) 402 determines whether or not an image data group stored in the decoded image file is the image data of a panoramic image group. For the determination whether or not the image data group is the image data of a panoramic image group, the same processing as the determination processing in the panoramic image determining unit 302 of the overlap deleting unit 202 can be performed.

An output format selecting unit 403 selects an output format with respect to the decoded image file. The output format selection herein refers to selecting, when the input image file comprises a plurality of pieces of image data obtained by panoramic image shooting, whether a panoramic image is synthesized to be transmitted or output or a plurality of pieces of image data are individually transmitted or output without synthesizing the panoramic image. Furthermore, it is possible to select to synthesize to transmit or output a panoramic image and at the same time to transmit or output a plurality of pieces of image data that are the synthesis source of the panoramic image.

A synthesis method selecting unit 404 is a portion to select a panorama synthesizing method when the output selection unit 403 selects to synthesize and transmit or output a panoramic image. In the panorama synthesizing method, a panorama shall be synthesized using an existing technique. Examples of the synthesis method include the conventionally known "position only method", "cylinder method", "perspective method", and the like.

A panorama synthesizing unit 405 generates a panoramic image by joining together a plurality of pieces of image data based on the synthesis method selected by the synthesis method selecting unit 404.

When the individual transmission or outputting of image data is selected by the output format selecting unit 403, and if the image data is image data whose overlap area has been deleted, then a restoration unit 406 restores the overlap area based on the attached positional information on the overlap area of the other image data.

An encoding unit 407 carries out encoding on the image file having been subjected to a series of processings.

Figure 5:
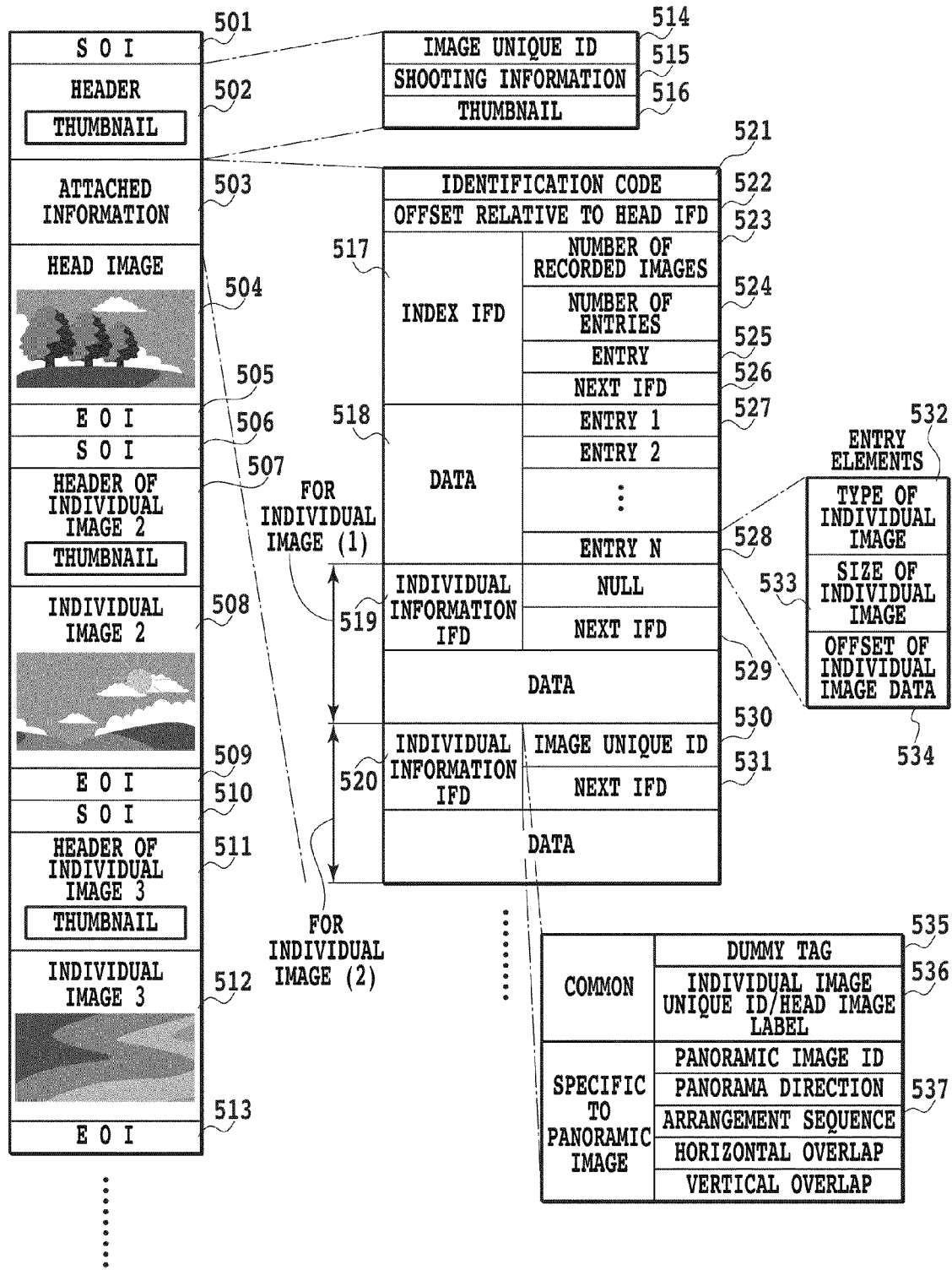
FIG. 5 is a view showing an example of the format of an image file to be input in the embodiment.

An example format of an input image file in this embodiment is shown in FIG. 5. The image file of FIG. 5 includes a plurality of pieces of image data and shooting information, wherein these data and information are associated with each other to constitute one file. That is, FIG. 5 shows a format example of the MPF described earlier.

An individual image constituting the image file corresponds to the image data present in an area sandwiched between an SOI marker (501, 506, 510) indicative of the start of one set of images and an EOI marker (505, 509, 513) indicative of the end of the image. Here, among the individual images constituting the image file, particularly, an individual image recorded on the head part of the file is referred to as a head image 504, and an area where the head image is recorded is referred to as a head image area. In displaying or printing, the head image is usually displayed or printed.

For the format of the image file, as shown in FIG. 5, the head image area is recorded on the head of the data and subsequently single or multiple individual images are recorded. Here, a tag defined by Exif (Exchangeable Image File format) is recorded in a header (502, 507, 511) of each individual image. As described earlier, Exif specifies the file format of a file having therein the shot image data along with the attached shooting information at the time of shooting.

Exif is employed together with Design rule for Camera File system (DCF) in digital cameras around the world.

Note that, an image unique ID 514 for identifying the image, shooting information 515 holding imaging conditions and the like of the respective image data, and a thumbnail 516 are respectively recorded in the header.

In addition to the header 502 for the head image, attached information 503 on the image file is recorded in the head image area. Firstly, an identification code 521 indicating whether the image file is an image file comprising a plurality of pieces of image data and an offset 522 relative to a head IFD (Image File Directory) are recorded in the attached information. The head IFD is an IFD for the head image. IFD refers to a set of data entries (similar to a file directory) having various kinds of parameters of image data, image-related data, a color map, and a point to the image data stored therein. The link structure of IFD includes the offset 522 relative to the head IFD, one index IFD 517, and subsequently one or more pieces of individual information IFD (519, 520). Among IFDs, one IFD is pointed to another by Next IFD (526, 529, 531) in a link source IFD. The individual information recorded in the individual information IFD (519, 520) includes the information (dummy tag 535, individual image unique ID/head image label ID 536) common regardless of the type of the individual information, and the information specific to the type of the individual image (537). The dummy flag 535, which is one of the common information, is originally used in creating individual information IFD of an empty MP (multi picture) that does not have information specific to the individual image. However, in the present invention, the dummy flag 535 is used as a location for storing the positional information used in the positional information attaching unit 306 and the restoration unit 406. The information specific to the type of an individual image will be described later because this is closely related to the present invention.

Note that, in the image data format, the index IFD 517 is defined as a set of tags indicative of the overall configuration of the individual image. The index IFD 517 comprises the number of recorded pixels 523 of an image file, the number of entries 524 that is the number of recorded images, and an entry 525. Moreover, the entry itself is one data structure (this structure is referred to as an entry element) for storing a type of an individual image 532, an image size 533, and an offset 534 relative to the image data. Here, entries as many as the number (527, 528) represented by the number of entries are recorded in the data area 518.

In the type of an individual image 532 contained in the entry element, information for managing the type of the individual image is stored. Table 1 shows the examples of information on the type of an individual image.

TABLE 1

| type | subdivision |
|---|---|
| image for monitor display | class 1 |
| | class 2 |
| multiview image | for stereoscopic view |
| | multi-angle |
| continuously shot images | |
| bracket image | exposure |
| | focus |
| | white balance |
| | amount of light emitted by flash |
| | red-eye reduction |
| | others |
| panorama | |

In this embodiment, information on whether a target individual image is an image for monitor display, a multiview image, a continuously shot image, a bracket image, or a panoramic image is held. With respect to an input image file having the above-described format, the panoramic image determining units 302, 402 determine whether or not the input image file comprises a panoramic image file. By paying an attention particularly to the type of an individual image 532 contained in the entry element, it is possible to determine whether or not the input image is the one shot using the panoramic image shooting function.

Note that, in this embodiment, as described above, one image file managed by associating a plurality of pieces of image data with the shooting information serves as an input image file, however, the respective image data might be recorded as a separate file. In this case, the present invention is also applicable in a method of separately managing the relation between these plurality of pieces of image data and imaging conditions (e.g., a filename of the image data related to the respective image data is written too or a separate management file is created). Moreover, in this case, the management file will contain the attached information 503 described above. In this case, in each of the processings described above, an equivalent processing can be performed by replacing "the image data group stored in an image file" with "the image data to be managed by the management file". Moreover, the data structure shown in FIG. 5 simply shows one example and therefore other data structure may be used.

Figure 6:
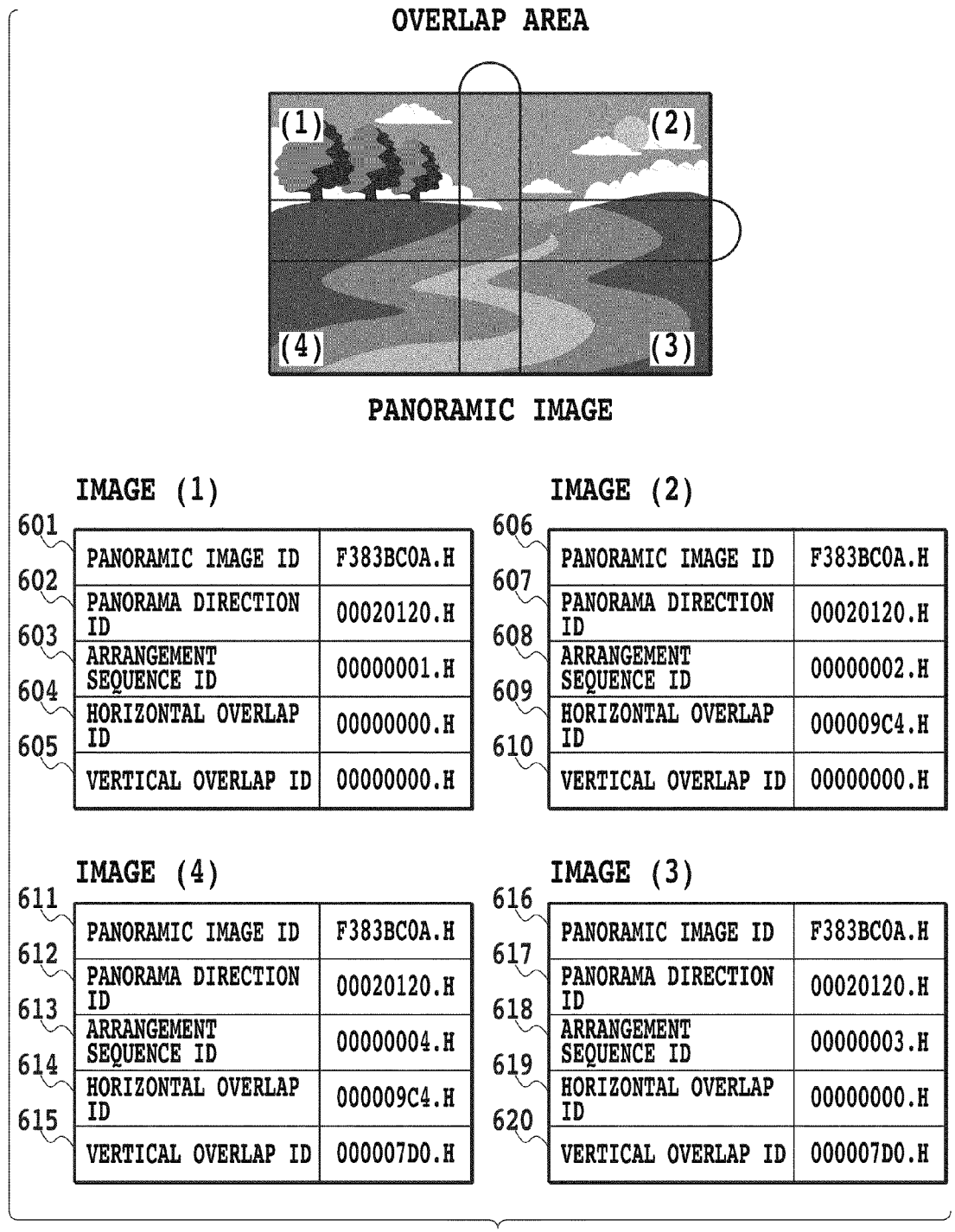
FIG. 6 is a view showing an example of a format specific to the type of an individual image, related to individual information IFD.
Figure 7:
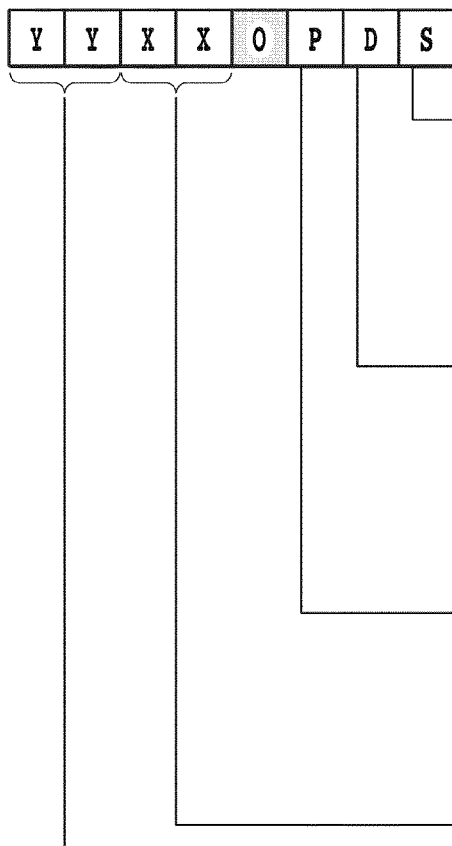
FIG. 7 is a view showing panorama directions in the format specific to the type of an individual image and example arrangements, related to the individual information IFD.

FIG. 6 shows examples of the format (537) specific to the type of an individual image, related to the individual information IFD (519, 520) on an image file to be input in this embodiment. An identification ID of a panoramic image is recorded in a panoramic image ID (601, 606, 611, 616). An shooting direction (arrangement method) of a panoramic photograph is recorded in a panorama direction ID (602, 607, 612, 617) (see FIG. 7). Referring to FIG. 7, with respect to the arrangement method in the case of shooting in one direction, simultaneous designation (e.g., simultaneously designate "from left to right", "from top to down" and the like) is disabled and also the arrangement methods not in use are nulled. With regard to the arrangement method in the case of shooting in two directions, a start position (the upper right, upper left, lower left, or lower right) of an image and the number of images arranged in one row are required (assuming that the number of images arranged in one row is the same). Moreover, when the arrangement method is a zigzag method, a start position (the upper right, upper left, lower left, or lower right) and the number of images arranged in a row and the number of images arranged in a column are required. For example, as apparent from an example of FIG. 7(a), since the images are arranged from "left to right" and the number of the images arranged in the row is "3", IDs indicative of these are given. Moreover, in an example of FIG. 7(b), "1" indicative of a clockwise rotation in the case of shooting in two directions is given and "2" indicating that the start position of the first image constituting a panorama is the upper left is given. Then, as apparent from this view, since the number of images arranged in one row is three and the number of images arranged in one column is three, "3" is given, respectively.

Returning to FIG. 6, a sequence number along an arrangement direction of images for a panorama is recorded in an arrangement sequence ID (603, 608, 613, 618). The arrangement sequence number of an integrated image after stitching (coupling) each panoramic image is set to "FFFFFFFF.H". For the purpose of use as a guidance useful for positioning of each image in constituting a panorama, a horizontal overlap and a vertical overlap are defined in an overlap area tag ID, as follows. The values of these tags do not strictly define the accuracy, the calculation method, whether or not it is used, and the like except their unit (%). A horizontal overlap width between two pieces of image data required in stitching (coupling) is recorded in a horizontal overlap ID (604, 609, 614, 619). The range of the overlap width possible to specify is from 0 to 10000, where 10000 represents 100%. A vertical overlap width between two pieces of image data required in stitching (coupling) is recorded in a vertical overlap ID (605, 610, 615, 620). The range of the overlap width possible to specify is from 0 to 10000, where 10000 represents 100%.

Figure 8:
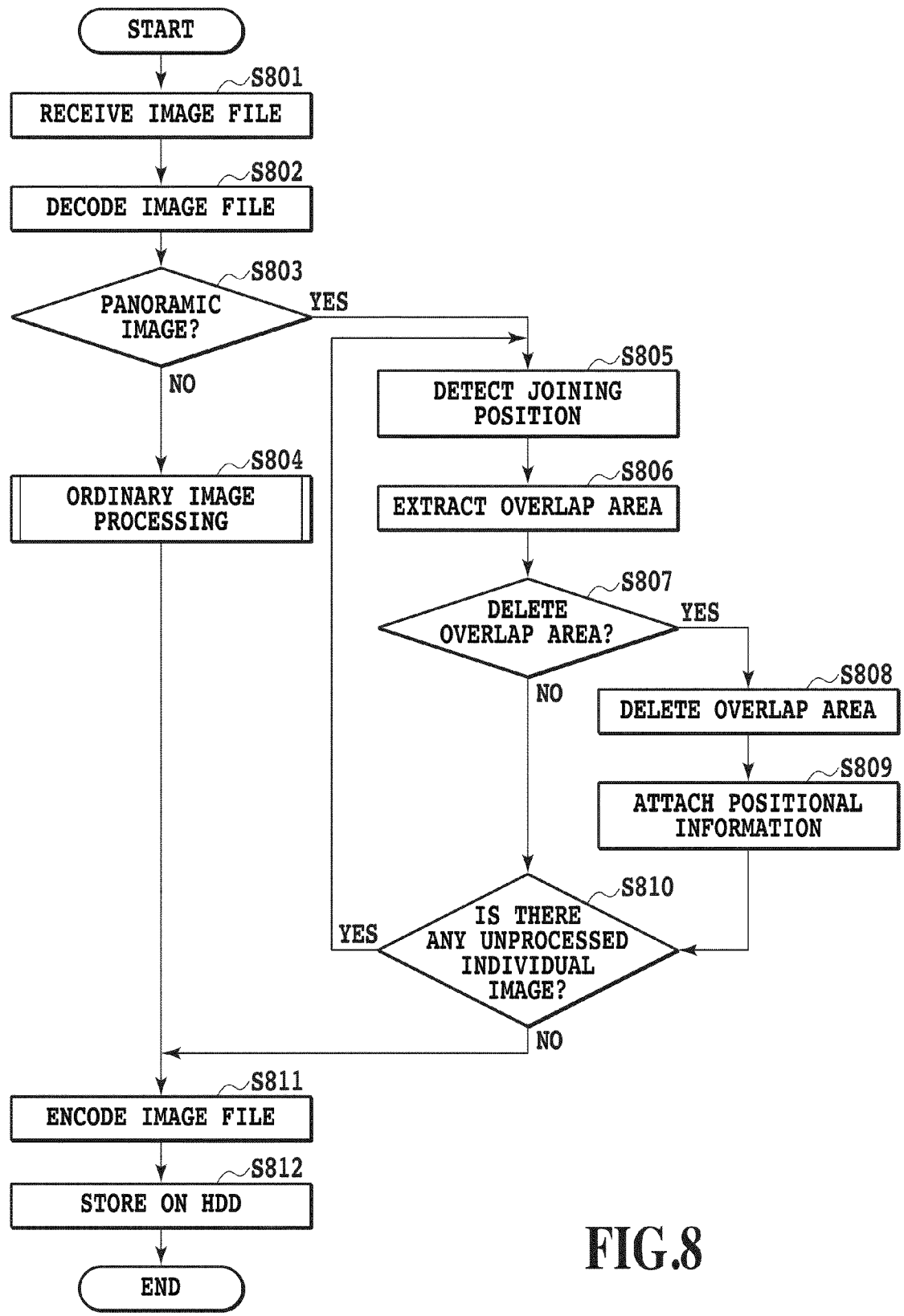
FIG. 8 is an exemplary process flowchart related to a receiving unit 201, an overlap deleting unit 202, and a recording unit 203 of Embodiment 1.
Figure 9:
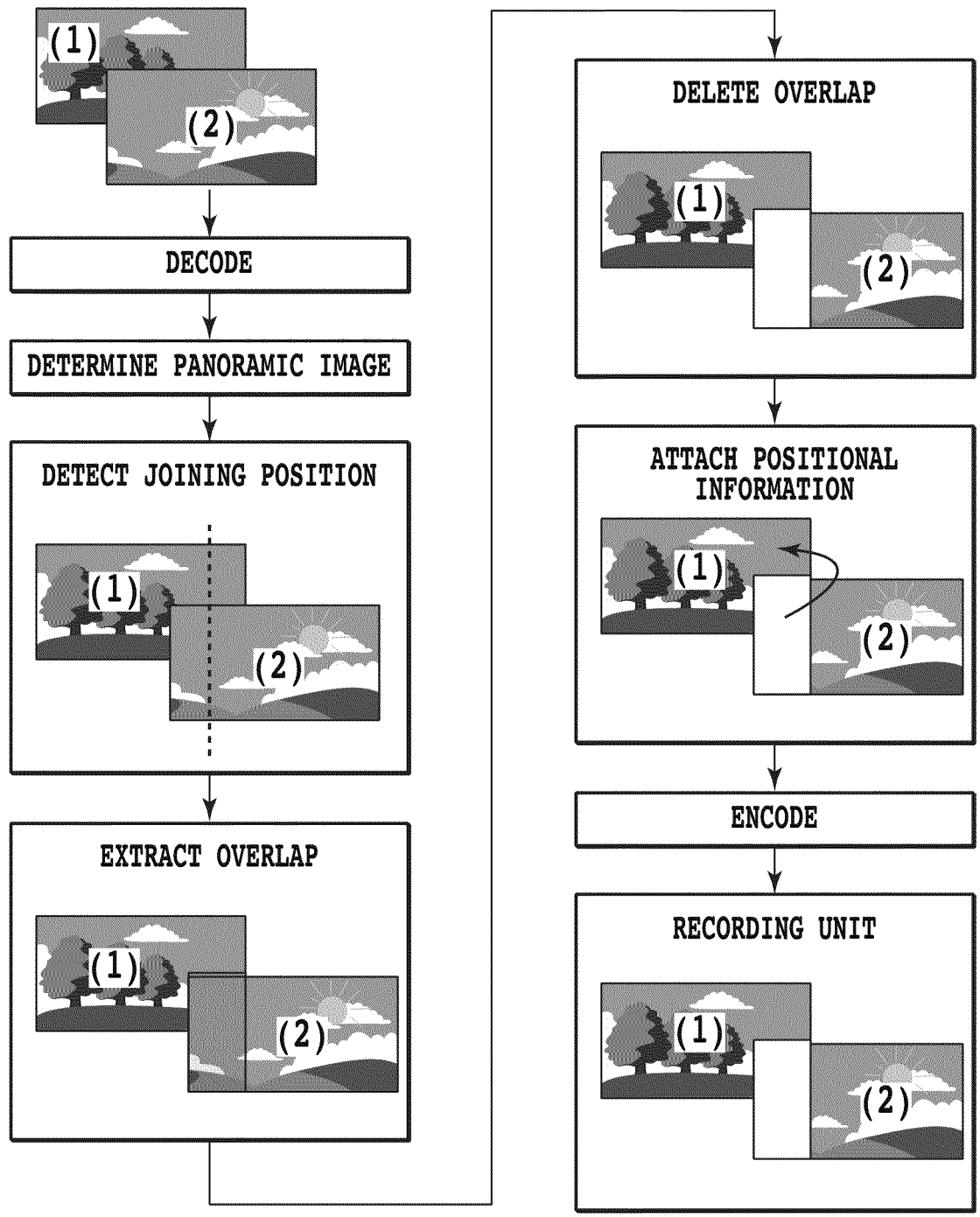
FIG. 9 is a schematic diagram related to the receiving unit 201, the overlap deleting unit 202, and the recording unit 203 of Embodiment 1.

FIG. 8 is an exemplary process flowchart related to the receiving unit 201, the overlap deleting unit 202, and the recording unit 203 of Embodiment 1. The schematic diagram is shown in FIG. 9. The following processings are performed by the CPU 101 based on a program stored in the ROM 102.

In Step S801, with the use of the receiving unit 201, an image file comprising the image data shot by an imaging device (not illustrated) and the shooting information when the image data is shot are input from the receiving unit 201. As described earlier, this shooting information contains the information indicating whether the image is a panoramic image, and the panoramic-image specific data for forming the panoramic image. The acquired image file is held on the RAM 103 of FIG. 1.

In Step S802, the encoded image file is decoded using the decoding unit 301. With regard to the encoding scheme, a wide variety of schemes, such as JPEG, JBIG, and JPEG2000, can be contemplated, but any technique may be employed.

In Step S803, with the use of the panoramic image determining unit 302, it is determined, with respect to the decoded image file, whether or not the image data group stored in the image file is the image data of a panoramic image group. With regard to the method of determining whether or not the image data group is the image data of a panoramic image group, it is possible to determine by referring to the type 530 of an individual image in the image data format.

If it is determined by the panoramic image determining unit 302 that the image data group is not the image data of a panoramic image group, then in Step S804 an ordinary processing is performed.

On the other hand, if it is determined by the panoramic image determining unit 302 that the image data group is the image data of a panoramic image group, then in Step S805, with the use of the position detecting unit 303, a joining position required in joining together a plurality of pieces of image data recorded in the image file is detected. In the method of detecting a joining position, the joining position shall be detected using an existing technique. For example, feature points are extracted, and then alignment is made by correlation calculation by affine transformation or plane projection transformation.

In Step S806, with the use of the overlap area extracting unit 304, an overlap area where two pieces of image data are overlapped with each other is extracted from each of image data based on the joining position detected by the position detecting unit 303.

In Step S807, with the use of the deleting unit 305, it is determined whether or not an overlap areas of one piece of image data detected by the overlap area extracting unit 304 is already deleted. If the overlap area of one piece of image data is already deleted, the image data is held without deleting an overlap area of other piece of image data serving as dual overlap area.

In Step S808, with the use of the deleting unit 305, a deleting process is performed on the image data whose overlap area is determined to be deleted in Step S807. Here, with regard to the deletion of the overlap area, a processing of blurring by means of a filter, a processing of thinning out pixel data, or a processing of converting image data into brightness (density) information may be performed instead of simply cutting off the image data, provided that the data size shall be reduced as compared with the original one.

In Step S809, with the use of the positional information attaching unit 306, positional information on the other overlap area serving as dual overlap area is attached to the header of the image data whose overlap area has been deleted by the deleting unit 305. The header herein complies with the data format of an input image file, and in this embodiment the dummy tag 535 shown in FIG. 5 is used. Alternatively, a local header used only in the image processing apparatus of the present invention may be created so that the above-described positional information is given in this header. The pieces of data to be recorded as the positional information are the image unique ID, horizontal overlap, and vertical overlap of the image data that has the other overlap area serving as duality overlap area. Alternatively, as the positional information, three-point (the start point, horizontal end point, and vertical end point of image data) positional information on the other overlap area serving as duality overlap area may be given in the header. Since these pieces of positional information have a much smaller data capacity than the image data of the overlapped part, the data capacity as a whole can be reduced by deleting the image data of the overlapped part and attaching the positional information.

In Step S810, it is determined, with respect to a plurality of pieces of image data recorded in the image file, whether or not there is any unprocessed data. If there is any unprocessed data, the processings of Steps S805 to S809 described above are performed.

In Step S811, with the use of the encoding unit 307, encoding is performed on the image file, which includes image data whose overlap area has been deleted and to which positional information has been attached and dual image data whose overlap area has not been deleted, having been subjected to a series of processings. Note that, when a plurality of pieces of image data are not stored in a single image file, encoding is performed on each image file, in which each image data containing image data whose overlapped part has been deleted is stored.

In Step S812, with the use of the recording unit 203, the image file encoded by the encoding unit 307 is recorded on the HDD 104.

Figure 10:
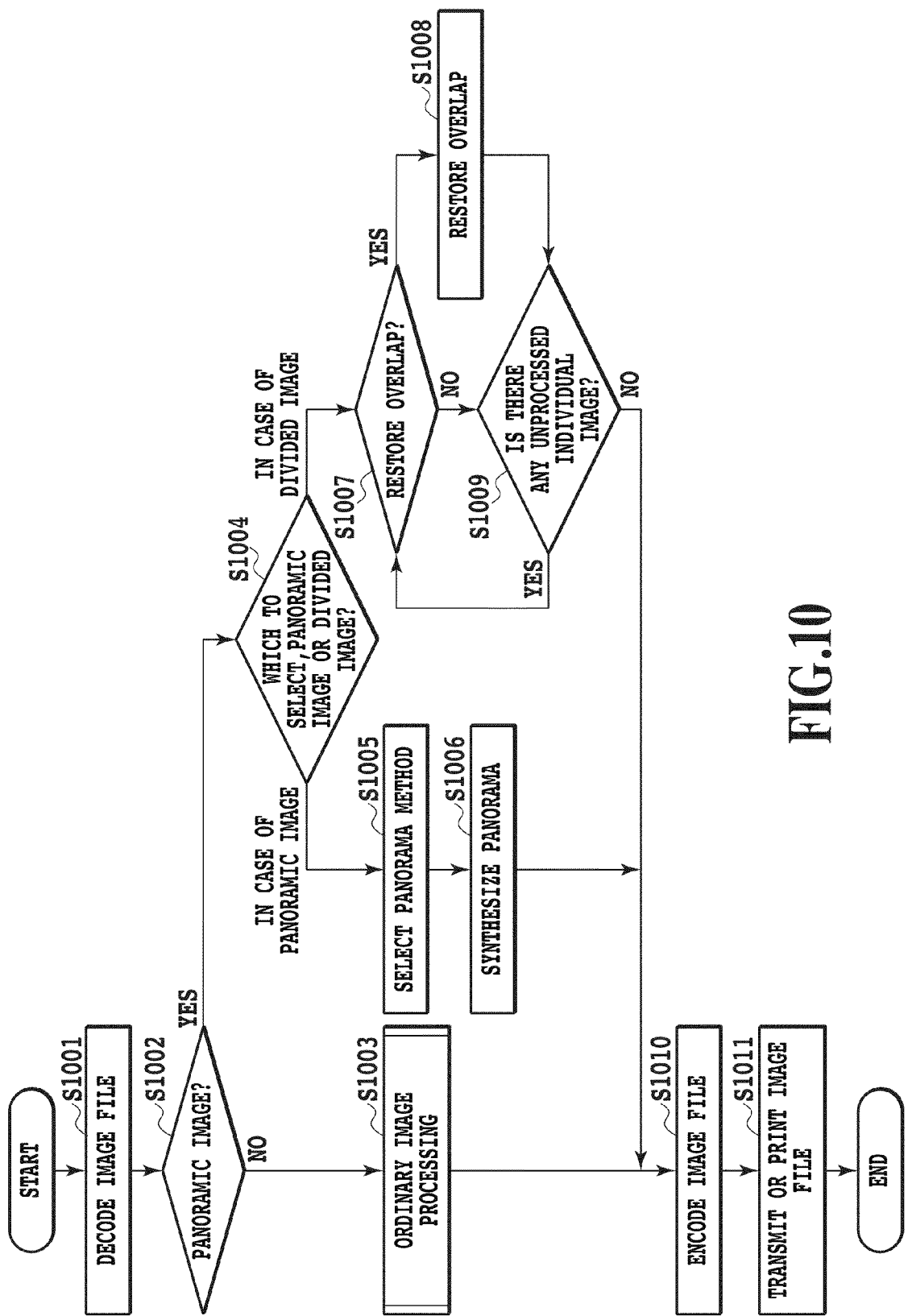
FIG. 10 is an exemplary process flowchart related to the recording unit 203, the overlap restoring unit 204, the transmitting unit 205, and the printing unit 206 of Embodiment 1.
Figure 11:
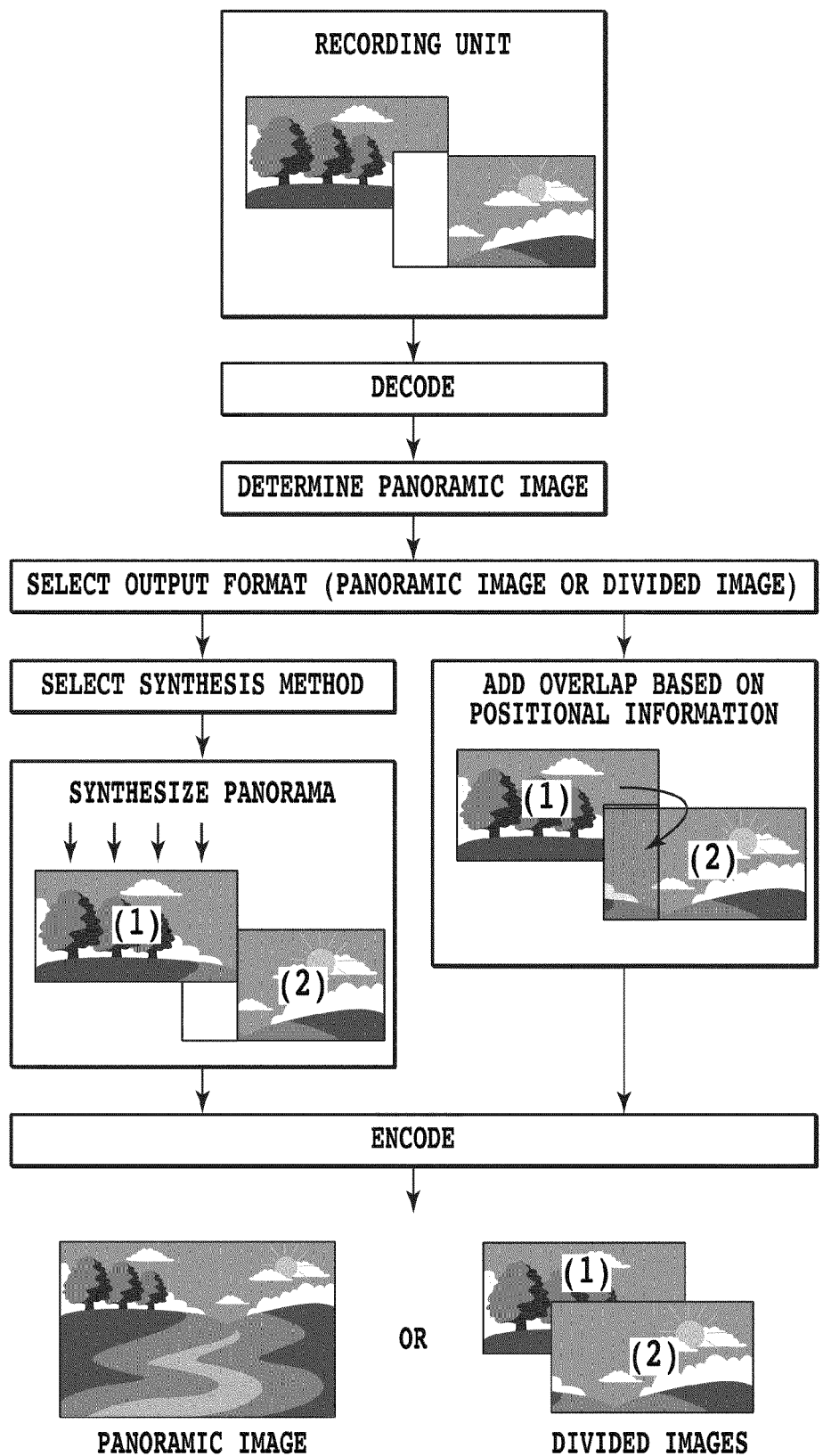
FIG. 11 is a schematic diagram related to the recording unit 203, the overlap restoring unit 204, the transmitting unit 205, and the printing unit 206 of Embodiment 1.

FIG. 10 is an exemplary process flowchart related to the recording unit 203, the overlap restoring unit 204, the transmitting unit 205, and the printing unit 206 of Embodiment 1. The schematic diagram is shown in FIG. 11. The following processings are performed by the CPU 101 based on a program stored in the ROM 102.

In Step S1001, the encoded image file is decoded using the decoding unit 401. With regard to the encoding scheme, a wide variety of schemes, such as JPEG, JBIG, and JPEG2000, can be contemplated, but any technique may be employed.

In Step S1002, with the use of the panoramic image determining unit 402, it is determined whether or not an image data group stored in the decoded image file is the image data of a panoramic image group. With regard to the method of determining whether or not the image data group is the image data of a panoramic image group, it is possible to determine by referring to the type 530 of an individual image in the image data format.

If it is determined by the panoramic image determining unit 402 that the image data group is not the image data of a panoramic image group, then in Step S1003 an ordinary processing is performed.

If it is determined by the panoramic image determining unit 402 that the image data group is the image data of a panoramic image group, then in Step S1004, the image data group is processed using the output format selecting unit 403. That is, it is selected, with respect to the decoded image file, whether a panoramic image is synthesized to be transmitted or output or a plurality of pieces of image data are individually transmitted or output. The determination material used here is a setting value for a determination condition that is input from the operating unit 106 using the displaying unit 105 in the image processing apparatus. Note that, in this case, as one of print environment setting items regardless of execution timing, the setting value may be always held or a screen display for interactively inputting the setting value may appear when a print button is pushed during warming up. Moreover, in the example of FIG. 10, an example of alternatively selecting a panoramic image or a divided image is shown, however, it is also possible to provide a setting value so as to select the both.

With the use of the synthesis method selecting unit 404, if it is selected to synthesize a panoramic image and transmit or output the same by the output format selecting unit 403, then in Step S1005 a panorama synthesizing method is selected. In the panorama synthesizing method, a panorama shall be synthesized using an existing technique. Examples of the synthesis method include the "position only method", "cylinder method", "perspective method", and the like. Note that the determination material used here is a setting value for a determination condition that is input from the operating unit 106 using the displaying unit 105 in the image processing apparatus, as with Step S1004. Note that, also, in this case, as one of print environment setting items regardless of execution timing, the setting value may be always held or a screen display for interactively inputting the setting value may appear when a print button is pushed during warming up.

In Step S1006, with the use of the panorama synthesizing unit 405, a panoramic image is generated by joining together a plurality of pieces of image data based on a synthesis method selected by the synthesis method selecting unit 404.

When it is selected by the output format selecting unit 403 to individually transmit or output a plurality of pieces of image data (divided images), then, in Step S1007, with the use of the restoration unit 406, it is determined whether or not the object image data is image data whose overlap area has been deleted by the deleting unit 305. If the overlap area is not deleted yet, the next Step S1008 will not be performed. Whether or not the object image data is image data whose overlap area has been deleted can be determined based on whether or not a deletion flag is on in the header, for example.

If it is determined that the object image data is image data whose overlap area has been deleted in Step S1007, then in Step S1008, with the use of the restoration unit 406, the overlap area is restored based on the attached positional information on the overlap area of the other image data. For example, the overlap area is restored by copying the image data of the overlap area of the other image data to the deleted area of the image data intended to be restored.

In Step S1009, it is determined, with regard to a plurality of pieces of image data recorded in the image file, whether or not there is any unprocessed one. If there is any unprocessed data, the processings of Steps S1007 to S1008 described above are performed.

In Step S1010, with the use of the encoding unit 407, encoding is performed on the image file having been subjected to a series of processings.

In Step S1011, in the case of transmission, with the use of transmitting unit 205, a predetermined image processing is applied and the created transmit data is transmitted to a PC or other image processing apparatus through the network I/F 108 or transmitted to an external recording device or the like through the external I/F 109. In the case of outputting, with the use of the outputting unit 206, a predetermined image processing is applied and the created print data is output by being sent to the image processing apparatus through the engine I/F 107.

Note that, in this embodiment, in Step S801, when an image file is input using the receiving unit 201, it may be determined whether or not the processing of the present invention is applied, and if this determination result is "No", the image file may be recorded, as it is, using the recording unit 203 without applying the processing of the present invention. The determination material used here is a setting value for a determination condition that is input from the operating unit 106 using the displaying unit 105 in the image processing apparatus. Note that, in this case, as one of print environment setting items regardless of execution timing, the setting value may be always held or a screen display for interactively inputting the setting value may appear when a print button is pushed during warming up.

As described above, according to Embodiment 1, it is possible to reduce the file size by deleting one of two overlap areas and attaching positional information on the other overlap area without degrading the image. Moreover, at the time of transmission or printing, it is possible to restore an image file or generate a panoramic image by restoring the overlap area based on the attached positional information. Moreover, even when an image file containing image data whose overlap area has been deleted in this manner is transmitted to other image processing apparatus, it is also possible to restore the overlap area and synthesize a panoramic image using any panoramic synthesis method in the destination image processing apparatus.

Embodiment 2

In Embodiment 1, in the case where an input image file comprises a plurality of pieces of image data obtained by panoramic image shooting, an example has been described, in which the file size at the time of recording is reduced by deleting one of two overlap areas and attaching the positional information on the other overlap area.

In Embodiment 2, the processings up to the processing of panoramic synthesis are performed upon receipt of an image file, and then a duplicated overlap areas is deleted in terms of synthesis and also image data that is the source data for panoramic synthesis is deleted, thereby reducing the file size at the time of recording. Also in Embodiment 2, the same configuration as that of FIG. 2 described in Embodiment 1 can be employed.

Figure 12:
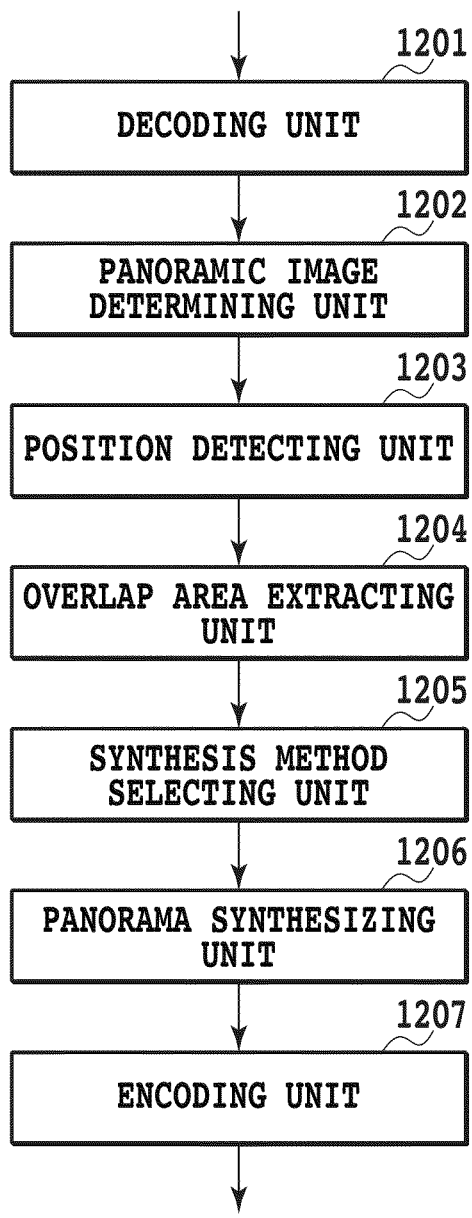
FIG. 12 is a block diagram illustrating an internal configuration of the overlap deleting unit 202 in Embodiment 2.

FIG. 12 is a block diagram illustrating a detailed configuration of the overlap deleting unit 202 in Embodiment 2 of the present invention.

A decoding unit 1201 is a portion to decode an encoded image file.

A panoramic image determining unit 1202 determines, with respect to a decoded image file, whether or not an image data group stored in the image file is the image data of a panoramic image group.

When the image data group is determined to be the image data of a panoramic image group by the panoramic image determining unit 302, a position detecting unit 1203 detects a joining position required in joining together a plurality of pieces of image data recorded in the image file.

An overlap area extracting unit 1204 extracts an overlap area where two pieces of image data are overlapped with each other, based on the joining position detected by the position detecting unit 303.

A synthesis method selecting unit 1205 is a portion to select a panorama synthesizing method. In the panorama synthesizing method, a panorama shall be synthesized using an existing technique. Examples of the synthesis method include the "position only method", "cylinder method", "perspective method", and the like. Note that, in Embodiment 2, since a panoramic image may be divided later into original images, a panoramic synthesis method of simply joining together a plurality of pieces of image data is preferable.

A panorama synthesizing unit 1206 generates a panoramic image by joining together a plurality of pieces of image data.

Note that, although not illustrated, it is possible to have an image data deleting unit that deletes the image data serving the source image data for a panoramic image after synthesizing the panoramic image.

Thus, Embodiment 2 is characterized in that the processings up to the processing of synthesizing a panoramic image in the overlap deleting unit 202 are performed, unlike Embodiment 1.

An encoding unit 1207 performs encoding on the image data.

Figure 13:
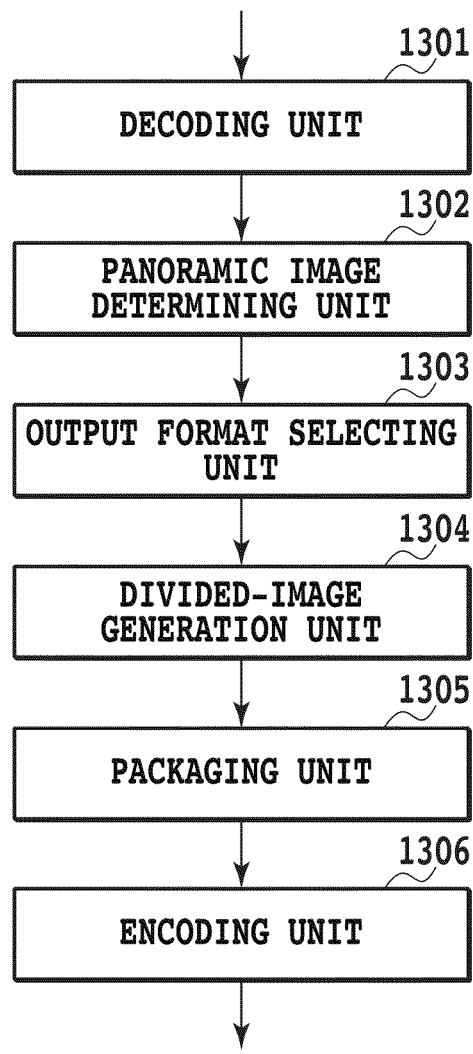
FIG. 13 is a block diagram illustrating an internal configuration of the overlap restoring unit 204 in Embodiment 2.

FIG. 13 is a block diagram illustrating a detailed configuration of the overlap restoring unit 204 in Embodiment 2 of the present invention.

A decoding unit 1301 is a portion to decode the encoded image data.

A panoramic image determining unit 1302 determines, with respect to the decoded image data, whether or not this image data is the image data of a panoramic image group.

An output format selecting unit 1303 selects an output format with respect to the decoded image data. The output format selection herein refers to selecting, when the input image data is for the panoramic image data, whether the panoramic image is transmitted or output as it is or the panoramic image is transmitted or output after being divided into a plurality of pieces of image data.

A divided-image generation unit 1304 is a portion which, when the output format selecting unit 1303 selects to divide and transmit or output the panoramic image, divides the panoramic image into a plurality of pieces of image data using any dividing method. In Embodiment 2, at a time point when the panoramic image has been generated, the overlap area is already deleted. For this reason, with regard to the generated divided images, an overlap area will not be generated.

A packaging unit 1305 packages a plurality of pieces of image data divided by the divided-image generation unit 1304, according to the format of the image file as shown in FIG. 5. Alternatively, when the divided images are generated, the packaging unit 1305 may package the divided images by separately generating a management file for managing each of the divided images.

An encoding unit 1306 carries out encoding on the image data having been subjected to a series of processings.

Figure 14:
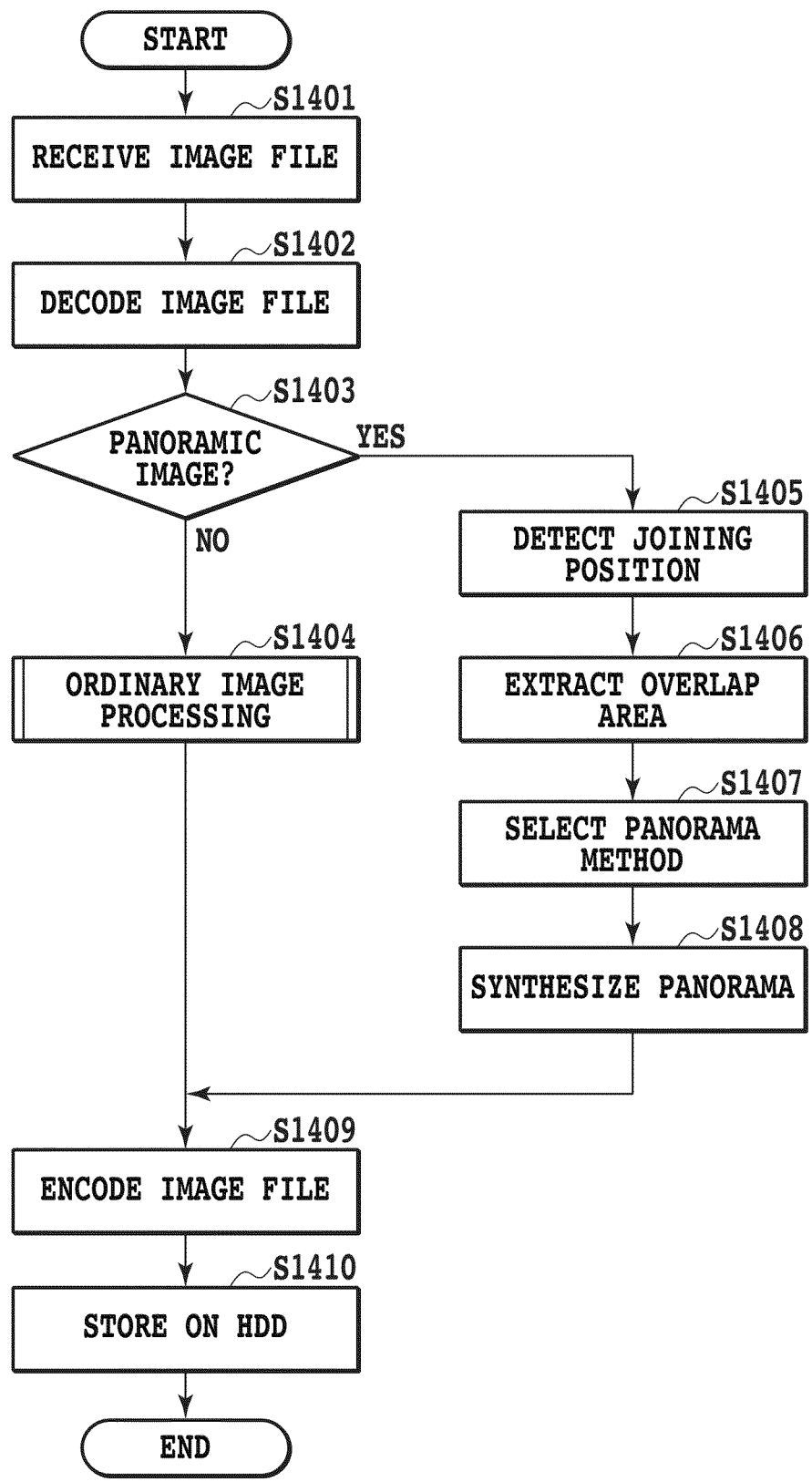
FIG. 14 is an exemplary process flowchart related to the receiving unit 201, the overlap deleting unit 202, and the recording unit 203 of Embodiment 2.

FIG. 14 is an exemplary process flowchart related to the receiving unit 201, the overlap deleting unit 202, and the recording unit 203 of Embodiment 2. The following processings are performed by the CPU 101 based on a program stored in the ROM 102.

In Step S1401, with the use of the receiving unit 201, an image file comprising the image data shot by an imaging device (not illustrated) and the shooting information when the image data is shot are input from the receiving unit 201. The acquired image file is held on the RAM 103 of FIG. 1.

In Step S1402, the encoded image file is decoded using the decoding unit 1201. With regard to the encoding scheme, a wide variety of schemes, such as JPEG, JBIG, and JPEG2000, can be contemplated, but any technique may be employed.

In Step S1403, with the use of the panoramic image determining unit 1202, it is determined, with respect to the decoded image file, whether or not an image data group stored in the image file is the image data of a panoramic image group. With regard to the method of determining whether or not the image data group is the image data of a panoramic image group, it is possible to determine by referring to the type 530 of an individual image in the image data format.

If it is determined by the panoramic image determining unit 1202 that the image data group is not the image data of a panoramic image group, then in Step S1404 an ordinary processing is performed.

In Step S1405, with the use of the position detecting unit 303, a joining position required in joining together a plurality of pieces of image data recorded in the image file is detected when the image date is determined to be the image data of a panoramic image group by the panoramic image determining unit 1202. In the method of detecting the joining position, the joining position shall be detected using an existing technique.

In Step S1406, with the use of the overlap area extracting unit 1204, an overlap area where two pieces of image data are overlapped with each other is extracted based on the joining position detected by the position detecting unit 1203.

In Step S1407, the panorama synthesizing method is selected using the synthesis method selecting unit 1205. In the panorama synthesizing method, a panorama shall be synthesized using an existing technique. Examples of the synthesis method include the "position only method", "cylinder method", "perspective method", and the like. Note that the determination material used here is a setting value for a determination condition that is input from the operating unit 106 using the displaying unit 105 in the image processing apparatus. Note that, in this case, as one of print environment setting items regardless of execution timing, a setting value may be always held, or the setting value may interactively appear when a print button is pushed during warming up. Moreover, since a panoramic image to be created in the next step may be divided later, a panoramic synthesis method of simply joining together a plurality of pieces of image data is preferable.

In Step S1408, with the use of the panorama synthesizing unit 1206, a panoramic image is generated by joining together the pieces of image data based on the overlap area extracted by the overlap area extracting unit 1204, in accordance with the synthesis method selected by the synthesis method selecting unit 1205. Note that, when a panoramic image is generated, the image data serving as the synthesis source of the panoramic image can be deleted.

In Step S1409, with the use of the encoding unit 1207, encoding is performed on the image data having been subjected to a series of processings.

In Step S1410, with the use of the recording unit 203, the image data encoded by the encoding unit 1207 is recorded on the HDD 104.

As described above, the processings of Embodiment 2 differ from those of Embodiment 1 in that the processings up to the processing of generating a panoramic image are performed after extracting an overlap area and then the resultant panoramic image is recorded on the HDD 104.

Figure 15:
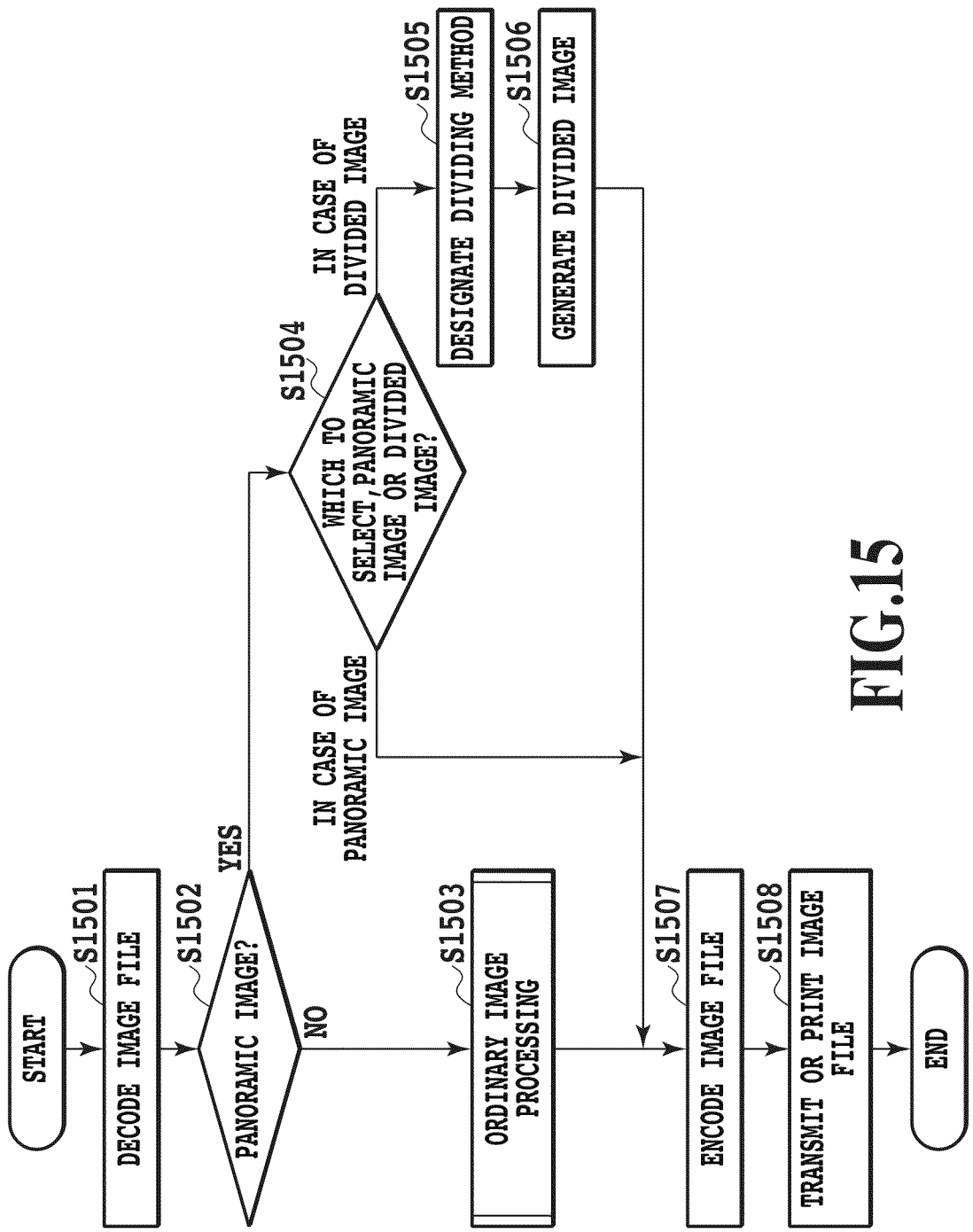
FIG. 15 is an exemplary process flowchart related to the recording unit 203, the overlap restoring unit 204, the transmitting unit 205, and the printing unit 206 of Embodiment 2.

FIG. 15 is an exemplary process flowchart related to the recording unit 203, the overlap restoring unit 204, the transmitting unit 205, and the printing unit 206 of Embodiment 2. The following processings are performed by the CPU 101 based on a program stored in the ROM 102.

In Step S1501, the encoded image data is decoded using the decoding unit 1301. With regard to the encoding scheme, a wide variety of schemes, such as JPEG, JBIG, and JPEG2000, can be contemplated, but any technique may be employed.

In Step S1502, with the use of the panoramic image determining unit 1302, it is determined whether or not the decoded image data is the image data of a panoramic image group. With regard to the method of determining whether or not the image data is the image data of a panoramic image group, it is possible to determine by referring to the image size given in the header of the image data.

If it is determined by the panoramic image determining unit 1302 that the image data is not the image data of a panoramic image group, an ordinary processing is performed in Step S1503.

In Step S1504, with the use of the output format selecting unit 1303, with respect to the coded image file, it is selected whether a panoramic image is transmitted or output as it is or the panoramic image is transmitted or output after being divided into a plurality of pieces of image. The determination material used here is a setting value for a determination condition that is input from the operating unit 106 using the displaying unit 105 in the image processing apparatus. Note that, in this case, as one of print environment setting items regardless of execution timing, a setting value may be always held or a screen display for inputting a setting value may interactively appear when a print button is pushed during warming up.

In the case of transmitting or outputting the divided images, a dividing method in dividing a panoramic image into a plurality of pieces of image data in the next Step S1506 is designated using the divided-image generation unit 1304 in Step S1505. For example, according to the format of the image file as shown in FIG. 5, a portion representing the most distinctive of a panoramic image (center portion or the like of the panoramic image) is divided as a main image while the other portion is divided as an individual image. Here, an example of designating the dividing method is a value that is input from the operating unit 106 using the displaying unit 105 in the image processing apparatus. Note that, in this case, as one of print environment setting items regardless of execution timing, the setting value may be always held or a screen display for interactively inputting the setting value may appear when a print button is pushed during warming up. Moreover, unless the dividing method is designated otherwise, a panoramic image is divided by a default dividing method that is established in advance in the image processing apparatus.

In Step S1506, with the use of the divided-image generation unit 1304, a panoramic image is divided in accordance with the dividing method determined in Step S1505.

Note that, in the example of FIG. 15, a panoramic image or a divided image is alternatively selected, however, selection to transmit or output the both images may be made so as to perform the respective processings.

In Step S1507, with the use of the encoding unit 1306, encoding is performed on the image file having been subjected to a series of processings.

In Step S1508, in the case of transmission, with the use of the transmitting unit 205, a predetermined image processing is applied and the created transmit data is transmitted to a PC or other image processing apparatus through the network I/F 108 or transmitted to an external recording device or the like through the external I/F 109. In the case of outputting, with the use of the outputting unit 206, a predetermined image processing is applied and the created print data is output by being sent to the image processing apparatus through the engine I/F 107.

As described above, according to Embodiment 2 of the present invention, the processings up to the processing of panoramic synthesis are performed upon receipt of the image data, and then the duplicated overlap area is deleted in terms of synthesis, thereby enabling a reduction of the file size without degrading the image. Moreover, at the time of transmission or printing, in the case of a panoramic image, it is transmitted or output as it is, while in the case of a divided image, a panoramic image is divided using any designated method and then the resultant divided images are transmitted or output. The divided images of Embodiment 2 are images obtained by dividing the panoramic image. Since an overlap area is already deleted in the panoramic image, the overlap area will not be generated also in the divided images. Thus, the overlap area is already deleted at the time of transmission or outputting either of a panoramic image or a divided image, and therefore, the file size can be reduced and the transfer rate or output rate can be improved although the synthesis method of the panoramic image is fixed.

Embodiment 3

In Embodiment 3, panorama synthesis is performed upon receipt of image data, whereby a duplicate overlap area is deleted in terms of synthesis. Thereafter, the generated panoramic image is re-divided into a plurality of pieces of image data using a designated dividing method. Then, these divided pieces of image data are recorded on the recording unit. This reduces the file size at the time of recording without degrading the image. Also in Embodiment 3, the same configuration as that of FIG. 2 described in Embodiment 1 can be employed.

Figure 16:
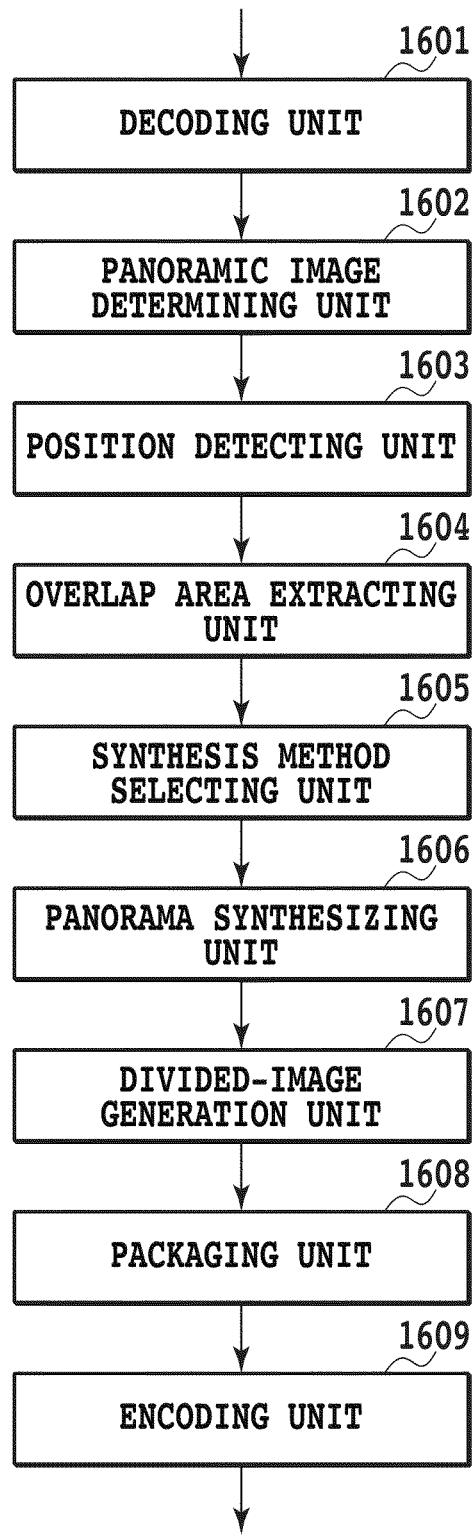
FIG. 16 is a block diagram illustrating an internal configuration of the overlap deleting unit 202 in Embodiment 3.

FIG. 16 is a block diagram illustrating a detailed configuration of the overlap deleting unit 202 in Embodiment 3 of the present invention.

A decoding unit 1601 is a portion to decode an encoded image file.

A panoramic image determining unit 1602 determines, with respect to the decoded image file, whether or not an image data group stored in the image file is the image data of a panoramic image group.

A position detecting unit 1603 detects, when the image date group is determined to be the image data of a panoramic image group by the panoramic image determining unit 302, a joining position required in joining together a plurality of pieces of image data recorded in the image file.

An overlap area extracting unit 1604 extracts an overlap area where two pieces of image data are overlapped with each other, based on the joining position detected by the position detecting unit 303.

A synthesis method selecting unit 1605 is a portion to select a panorama synthesizing method. In the panorama synthesizing method, a panorama shall be synthesized using an existing technique. Examples of the synthesis method include the "position only method", "cylinder method", "perspective method", and the like. In Embodiment 3, since the panoramic image is divided later, a panoramic synthesis method of simply joining together a plurality of pieces of image data is preferable.

A panorama synthesizing unit 1606 generates a panoramic image by joining together a plurality of pieces of image data. Moreover, in Embodiment 3, after generating a panoramic image, the image data serving as the synthesis source of the panoramic image is deleted.

A divided-image generation unit 1607 is a portion to divide the panoramic image into a plurality of pieces of image data using any dividing method. In Embodiment 3, a panoramic image is once generated and the overlap area is deleted, and thereafter the divided images are generated.

A packaging unit 1608 packages a plurality of pieces of image data divided by the divided-image generation unit 1607, according to the format of the image file as shown in FIG. 5.

An encoding unit 1609 performs encoding on the image file that has been packaged by the packaging unit 1608.

Figure 17:
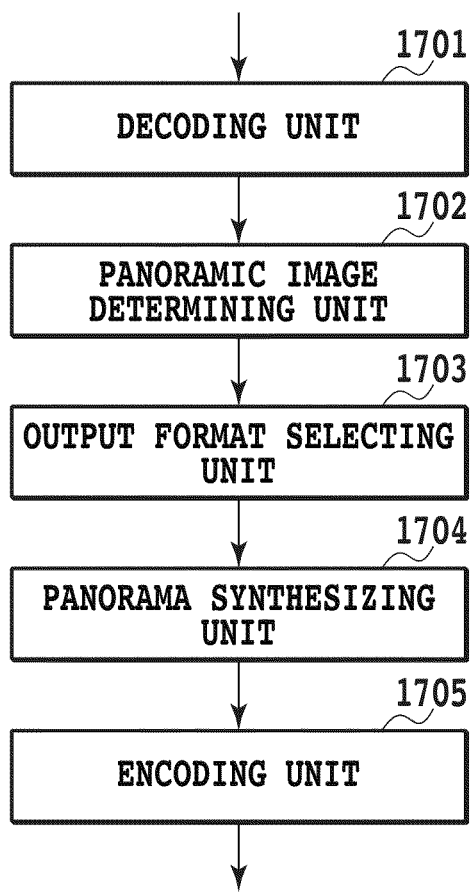
FIG. 17 is a block diagram illustrating an internal configuration of the overlap restoring unit 204 in Embodiment 3.

FIG. 17 is an exemplary process flowchart related to the recording unit 203, the overlap restoring unit 204, the transmitting unit 205, and the printing unit 206 of Embodiment 3. The following processings are performed by the CPU 101 based on a program stored in the ROM 102.

A decoding unit 1701 is a portion to decode an encoded image file.

A panoramic image determining unit 1702 determines whether or not an image data group stored in the decoded image file is the image data of a panoramic image group. Note that, in Embodiment 3, the divided image obtained by dividing the synthesized panoramic image will be decoded by the decoding unit 1701. Note that, also in the case of the divided image obtained by dividing a panoramic image, the attribute of the image data is a "panoramic image."

An output form selecting unit 1703 selects an output form with respect to the decoded image file. The output form selection herein refers to selecting, when an input image file comprises a plurality of pieces of image data obtained by panoramic image shooting, whether the panoramic image is synthesized and transmitted or output or a plurality of pieces of image data are individually transmitted or output. That is, the output format with respect to the image data of the divided image obtained by dividing the synthesized panoramic image will be selected.

A panorama synthesizing unit 1704 generates a panoramic image again by joining together a plurality of pieces of image data based on the synthesis method selected by the synthesis method selecting unit 1605. The panorama synthesizing unit 1704 in Embodiment 3 can synthesize again using the same synthesis method as that of a panoramic image serving as a source to be divided into a plurality of pieces of image data. An encoding unit 1705 carries out encoding on the image file having been subjected to a series of processings.

Figure 18:
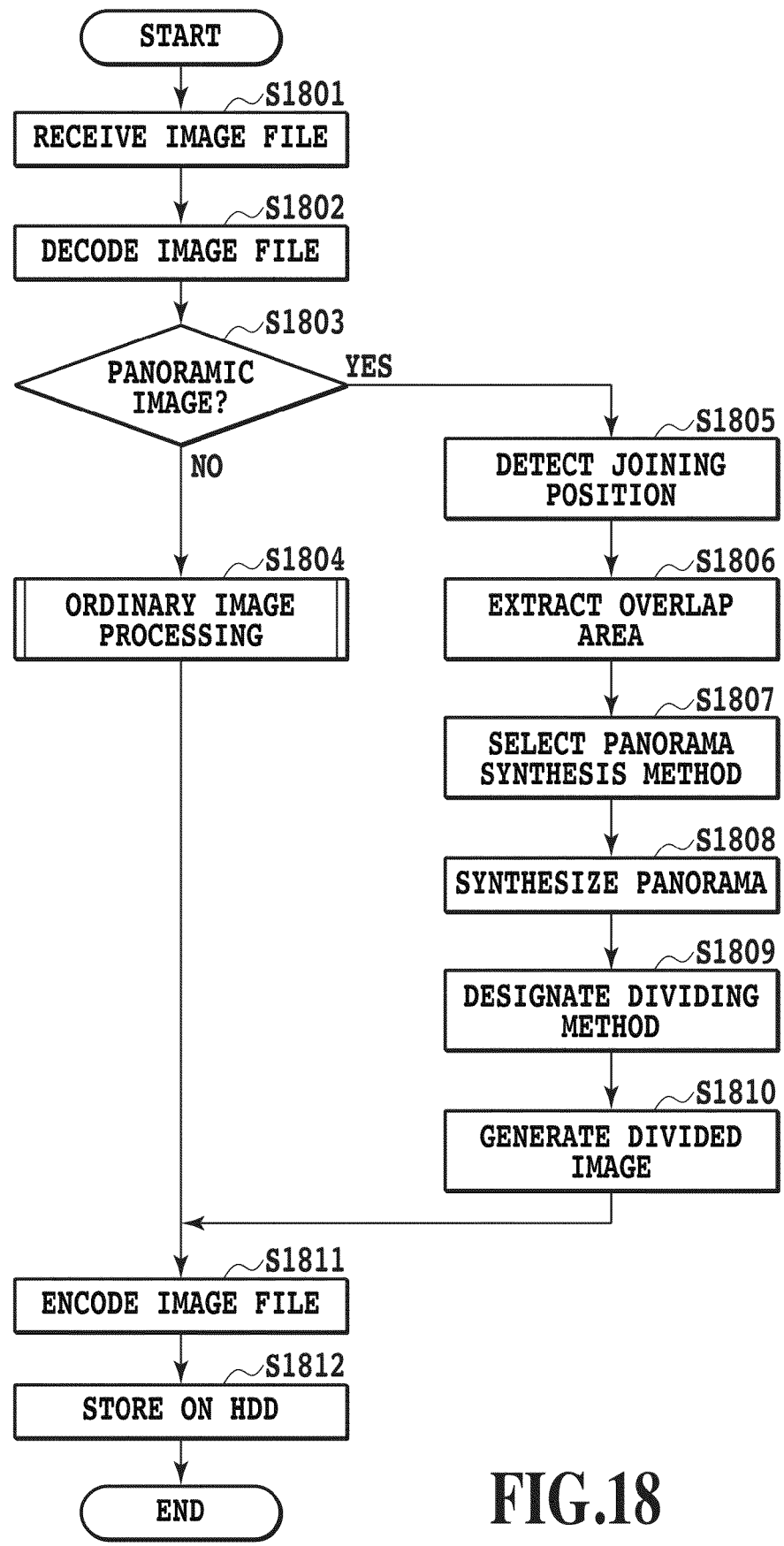
FIG. 18 is an exemplary process flowchart related to the receiving unit 201, the overlap deleting unit 202, and the recording unit 203 of Embodiment 3.

FIG. 18 is an exemplary process flowchart related to the receiving unit 201, the overlap deleting unit 202, and the recording unit 203 of Embodiment 3. The following processings are performed by the CPU 101 based on a program stored in the ROM 102.

In Step S1801, with the use of the receiving unit 201, an image file comprising the image data shot by an imaging device (not illustrated) and the shooting information at the time of shotting the image data is input from the receiving unit 201. The acquired image file is held on the RAM 103 of FIG. 1.

In Step S1802, an encoded image file is decoded using the decoding unit 1601. With regard to the encoding scheme, a wide variety of schemes, such as JPEG, JBIG, and JPEG2000, can be contemplated, but any technique may be employed.

In Step S1803, with the use of the panoramic image determining unit 1602, it is determined whether or not an image data group stored in the decoded image file is the image data of a panoramic image group. With regard to the method of determining whether or not the image data group is the image data of a panoramic image group, it is possible to determine by referring to the type 530 of an individual image in the image data format.

If it is determined by the panoramic image determining unit 1602 that the image data group is not the image data of a panoramic image group, then in Step S1804 an ordinary processing is performed.

If it is determined by the panoramic image determining unit 1602 that the image data group is the image data of a panoramic image group, then in Step S1805, with the use of the position detecting unit 1603, a joining position required in joining together a plurality of pieces of image data recorded in the image file is detected. In the method of detecting the joining position, the joining position shall be detected using an existing technique.

In Step S1806, with the use of the overlap area extracting unit 1604, an overlap area where two pieces of image data are overlapped with each other is extracted based on the joining position detected by the position detecting unit 1603.

In Step S1807, the panorama synthesizing method is selected using the synthesis method selecting unit 1605. In the panorama synthesizing method, a panorama shall be synthesized using an existing technique. Examples of the synthesis method include the "position only method", "cylinder method", "perspective method", and the like. Note that the determination material used here is a setting value for a determination condition that is input from the operating unit 106 using the displaying unit 105 in the image processing apparatus. Note that, in this case, as one of print environment setting items regardless of execution timing, the setting value may be always held or a screen display for interactively inputting the setting value may appear when a print button is pushed during warming up. Moreover, in Embodiment 3, since a panoramic image to be created in the next step is divided later, a panoramic synthesis method of simply joining together a plurality of pieces of image data is preferable.

In Step S1808, with the use of the panorama synthesizing unit 1606, a panoramic image is generated by joining together a plurality of pieces of image data based on the extracted overlap area in accordance with the synthesis method selected by the synthesis method selecting unit 1605.

In Step S1809, with the use of the divided-image generation unit 1607, an image dividing method in dividing a panoramic image into a plurality of pieces of image data in the next Step S1810 is designated. For example, according to the format of an image file as shown in FIG. 5, a portion representing the most distinctive of a panoramic image (center portion or the like of the panoramic image) is divided as a main image while the other portion is divided as an individual image. Here, as the designation of the image dividing method, a value that is input from the operating unit 106 using the displaying unit 105 in the image processing apparatus is used. Note that, in this case, as one of print environment setting items regardless of execution timing, the setting value may be always held or a screen display for interactively inputting the setting value may appear when a print button is pushed during warming up. Moreover, unless the dividing method is designated otherwise, a panoramic image is divided by a default dividing method that is established in advance in the image processing apparatus.

In Step S1810, with the use of the divided-image generation unit 1607, a panoramic image is divided in accordance with the dividing method determined in S1809.

In Step S1811, with the use of the encoding unit 1609, encoding is performed on the image data having been subjected to a series of processings.

In Step S1812, with the use of the recording unit 203, the image data encoded by the encoding unit 1609 is recorded on the HDD 104.

As described above, in the example of Embodiment 3, the overlap area is deleted to generate a panoramic image once. Then, Embodiment 3 is characterized in that the generated panoramic image is divided into a plurality of pieces of image data (divided images) and these divided image data are recorded on the HDD 104.

Figure 19:
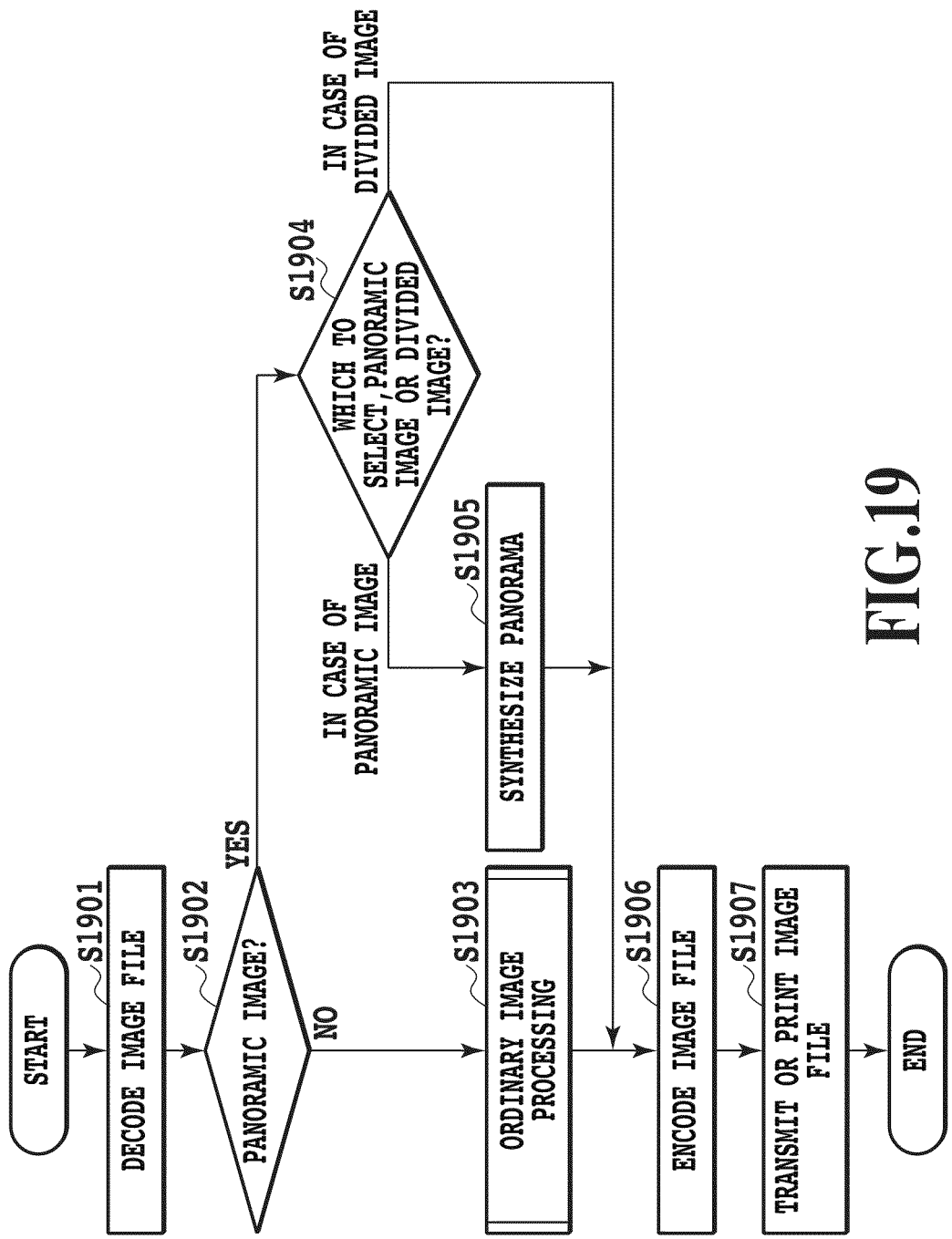
FIG. 19 is an exemplary process flowchart related to the recording unit 203, the overlap restoring unit 204, the transmitting unit 205, and the printing unit 206 of Embodiment 3.

FIG. 19 is an exemplary process flowchart related to the recording unit 203, the overlap restoring unit 204, the transmitting unit 205, and the printing unit 206 of Embodiment 3. The following processings are performed by the CPU 101 based on a program stored in the ROM 102.

In Step S1901, an encoded image data is decoded using the decoding unit 1701. With regard to the encoding scheme, a wide variety of schemes, such as JPEG, JBIG, and JPEG2000, can be contemplated, but any technique may be employed.

In Step S1902, with the use of the panoramic image determining unit 1702, it is determined whether or not this decoded image data is the image data of a panoramic image group. With regard to the method of determining whether or not the image data is panoramic image data, it is possible to determine by referring to the image size given in the header of the image data.

If it is determined by the panoramic image determining unit 1702 that the image data is not the panoramic image data, an ordinary processing is performed in Step S1903.

In Step S1904, with the use of the output format selecting unit 1703, with respect to the decoded image file, it is selected whether a panoramic image is transmitted or output or the divided images obtained by dividing the panoramic image into a plurality of pieces of image data are transmitted or output as it is. The determination material used here is a setting value for a determination condition that is input from the operating unit 106 using the displaying unit 105 in the image processing apparatus. Note that, in this case, as one of print environment setting items regardless of execution timing, the setting value may be always held or a screen display for interactively inputting the setting value may appear when a print button is pushed during warming up.

In Step S1905, a panoramic image is generated again by joining together a plurality of pieces of image data based on the synthesis method selected by the synthesis method selecting unit 1605.

In Step S1906, with the use of the encoding unit 1705, encoding is performed on the image file having been subjected to a series of processings.

In Step S1907, in the case of transmission, with the use of the transmitting unit 205, a predetermined image processing is applied and the created transmit data is transmitted to a PC or other image processing apparatus through the network I/F 108 or transmitted to an external recording device or the like through the external I/F 109. In the case of outputting, with the use of the outputting unit 206, a predetermined image processing is applied and the created print data is output by being sent to the image processing apparatus through the engine I/F 107.

As described above, according to Embodiment 3 of the present invention, panorama synthesis is performed upon receipt of image data, whereby the duplicate overlap area is deleted in terms of synthesis. Thereafter, the generated panoramic image is re-divided into a plurality of pieces of image data using a designated dividing method. Then, an image file containing this re-divided image data is stored on a storage medium. This can reduce the file size at the time of recording without degrading the image. Moreover, at the time of transmission or printing, in the case of a divided image, it is transmitted or output as it is, while in the case of a panoramic image, it is subjected to panorama synthesis again using the method that was used in panorama synthesis once, and the resultant panoramic image is transmitted or output. Thereby, the overlap area is already deleted also at the time of transmission or outputting, and therefore, the file size can be reduced and the transfer rate or output rate can be improved although the synthesis method of the panoramic image is fixed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-100174, filed Apr. 16, 2009, which is hereby incorporated by reference herein in its entirety.

What is claimed is:

1. An image processing apparatus, comprising:
a receiving unit for receiving a plurality of pieces of image data;
a panoramic image determining unit for determining whether or not a type of the received image data is image data of a panoramic image group;
an overlap area extracting unit for extracting an overlap area that is an overlapping area in the plurality of pieces of image data, when a determination result of the panoramic image determining unit indicates the image data of the panoramic image group;
a deleting unit for deleting the overlap area extracted by the overlap area extracting unit, with respect to one of the plurality of pieces of image data;
a positional information attaching unit for attaching positional information indicative of other overlap area having the overlapping area, to the image data whose overlap area has been deleted by the deleting unit; and a recording unit for storing therein an image file, the image file including image data to which the positional information are attached and image data having said other overlap area.

2. The image processing apparatus according to claim 1, further comprising a position detecting unit for detecting a joining position of the image data with respect to each of the pieces of image data, when a determination result of the panoramic image determining unit indicates the image data of the panoramic image group.

3. The image processing apparatus according to claim 1, further comprising a selecting unit for selecting whether or not the processing by each of the receiving unit, the panoramic image determining unit, the overlap area extracting unit, the deleting unit, the positional information attaching unit, and the recording unit is applied.

4. The image processing apparatus according to claim 1, wherein the position information include an image unique ID of image data having other overlap area having the overlapping area, a horizontal overlap and a vertical overlap.

5. An image processing method, comprising:
- a receiving step for receiving a plurality of pieces of image data;
- a panoramic image determining step for determining, with a computer processor, whether or not a type of the received image data is image data of a panoramic image group;
- an overlap area extracting step for extracting an overlap area that is an overlapping area in the plurality of pieces of image data, when a determination result of the panoramic image determining step indicates the image data of the panoramic image group;
- a deleting step for deleting the overlap area extracted by the overlap area extracting step, with respect to one of the plurality of pieces of image data;
- a positional information attaching step for attaching positional information indicative of other overlap area having the overlapping area, to the image data whose overlap area has been deleted by the deletion step; and
- a writing step for writing onto a recording unit an image file, the image file including image data to which the positional information are attached and image data having said other overlap area.

6. A computer readable storage medium storing a computer control program for causing a computer to perform an image processing method, the image processing method comprising the steps of:
- receiving a plurality of pieces of image data;
- determining whether or not a type of the received image data is image data of a panoramic image group;
- extracting an overlap area that is an overlapping area in the plurality of pieces of image data, when a determination result of the determining step indicates the image data of the panoramic image group;
- deleting the overlap area extracted by the extracting step with respect to one of the plurality of pieces of image data;
- attaching positional information indicative of other overlap area having the overlapping area, to the image data whose overlap area has been deleted by the deletion step; and
- writing onto a recording unit an image file, the image file including image data to which the positional information are attached and image data having said other overlap area.

* * * * *